United States Patent [19]
Fukushima

[11] Patent Number: 6,121,997
[45] Date of Patent: *Sep. 19, 2000

[54] IMAGE FORMING APPARATUS FOR HAVING AN ARBITRARY NUMBER OF SCREEN LINES AND SCREEN ANGLES BY CONTROLLING PIXEL DOT RECORDING TIMING

[75] Inventor: Satoru Fukushima, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/712,800

[22] Filed: Sep. 12, 1996

Related U.S. Application Data

[63] Continuation of application No. 08/267,713, Jun. 29, 1994, abandoned.

[30] Foreign Application Priority Data

Jun. 30, 1993 [JP] Japan ................................. 5-161386

[51] Int. Cl.[7] ........................ B41J 2/47; G01D 15/34; G02B 26/00; G02B 27/00
[52] U.S. Cl. ..................... 347/261; 347/257; 347/115
[58] Field of Search ................................... 347/261, 257, 347/115, 116; 358/448, 300; 399/823

[56] References Cited

U.S. PATENT DOCUMENTS 4,980,757  12/1990  Nishigaki .
5,376,956  12/1994  Nagao et al. ........................... 347/115

*Primary Examiner*—John Barlow
*Assistant Examiner*—Raquel Yvette Gordon
*Attorney, Agent, or Firm*—Fitzpatrick, Cella, Harper & Scinto

[57] ABSTRACT

The present invention discloses an image forming apparatus capable of preventing generation of color shade and moire fringes and forming an image exhibiting excellent image quality by setting recording intervals, which are different for each of a plurality of color signals, and by forming a color image having the number of screen lines and screen angles different for respective color signals in accordance with the set recording intervals.

19 Claims, 22 Drawing Sheets

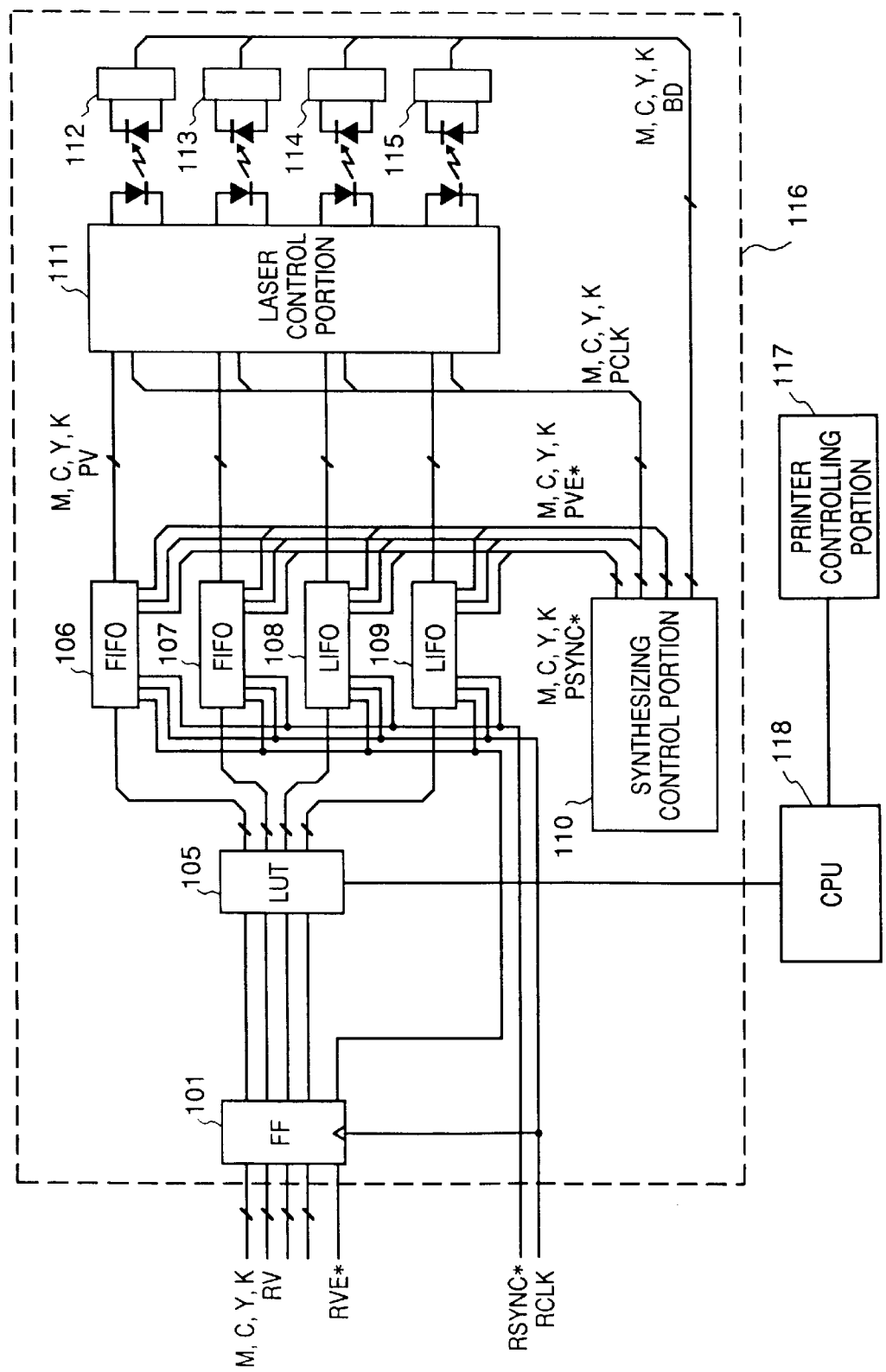

FIG. 13

| COLOR | NUMBER OF SCREEN LINES | SCREEN ANGLE |
|---|---|---|
| M | 176 LINES | 18° |
| C | 174 LINES | 56° |
| Y | 176 LINES | 72° |
| K | 174 LINES | 34° |

IMAGE FORMING APPARATUS FOR HAVING AN ARBITRARY NUMBER OF SCREEN LINES AND SCREEN ANGLES BY CONTROLLING PIXEL DOT RECORDING TIMING

This application is a continuation of application Ser. No. 08/267,713 filed Jun. 29, 1994, now abandoned.

BACKGROUND OF THE INVENTION

The present invention relates to a printer, a copying machine or the like of a laser beam, thermal transfer, ink jet or another type, and more particularly to an image forming apparatus such as a color printer or a color copying machine for recording a plural color image.

Hitherto, a variety of printers and copying machines of a laser beam type, a thermal transfer type, an ink jet type and so forth have been suggested. A major portion of the printers and copying machines of the foregoing types are digital apparatuses arranged such that its recording means is scanned in the main scanning direction and its recording medium is scanned in the sub-scanning direction to two-dimensionally form an image.

In particular, color printers and color copying machines usually have an arrangement that the foregoing operations are performed plural times for a plurality of colors to form a multi-color image.

Although the printers and copying machines of the foregoing type are able to operate preferably, there arises the following problems when a multi-color image is formed.

In a case where a multi-color image is formed by superimposing mono-color images on a recording medium, slight deviation of the image recording position for each color cannot be prevented. Therefore, color shade and moire fringes can be generated undesirably due to change in the state of color mixture. In order to prevent the foregoing problems, a method has been employed in which each color image has an individual screen angle.

However, a digital recording method having a reference recording period of about 400 DPI encounters a fact that the screen angle and the number of screen lines, which can be formed, are limited. What is worse, undesirable difference in the number of screen lines for each color results in generation of a peculiar texture pattern. As a result, a satisfactory image quality cannot be obtained.

SUMMARY OF THE INVENTION

The present invention has been found to overcome the foregoing problems and therefore an object of the present invention is to provide an image forming apparatus capable of preventing generation of color shade and moire fringes and obtaining an image exhibiting excellent image quality.

In order to achieve the foregoing object, an image forming apparatus according to the present invention has the following structure:

That is, according to the present invention, there is provided an image forming apparatus for forming a color image in response to a plurality of color signals, comprising: setting means for setting recording intervals of the sub-scanning direction which are different respectively for the plural color signals; and image forming means for forming a color image in accordance with the recording intervals set by setting means.

As a result of the thus-arranged structure, a color image can be formed and recording can be performed in accordance with the different recording interval respectively set for the plural color signals so that generation of color shade and moire fringes is prevented and an image exhibiting excellent image quality is obtained.

Further objects, features and advantages of the present invention will become apparent from the following detailed description of embodiments of the present invention with reference to the accompanying drawings.

BRIEF DESCRIPTION OF THE DRAWINGS

FIG. 1 is a schematic block diagram showing the structure of an image forming apparatus according to a first embodiment;

FIG. 13 is a table showing number of screen lines and screen angles set for respective colors;

DESCRIPTION OF THE PREFERRED EMBODIMENTS

Figure 2A:
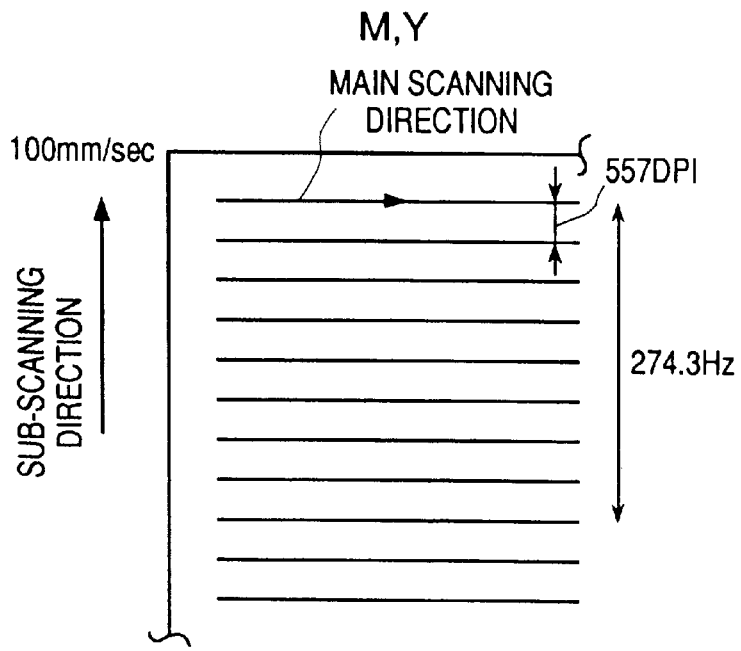
FIGS. 2A and 2B are diagrams showing sub-scanning densities for respective colors.
Figure 2B:
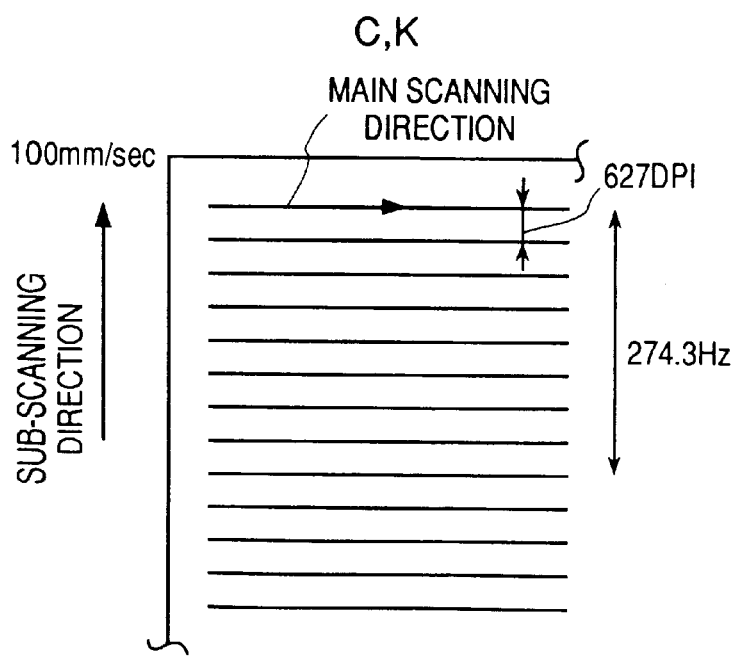

Preferred embodiments of the present invention will now be described with reference to the drawings.

<First Embodiment>

In the first embodiment, an electrophotographic color printer shown in FIG. 3 will now be described as a typical image forming apparatus in which the present invention can be embodied preferably. Note that the present invention may be variably applied to an image forming apparatus such as a white and black electrophotographic printer, an ink jet, thermal transfer or another type printer, a copying machine or a facsimile machine as well as the electrophotographic color printer structured as shown in FIG. 3.

<Main Block Structure of Printer>

FIG. 1 is a schematic block diagram showing the structure of an image forming apparatus according to the first embodiment. Referring to FIG. 1, reference numeral 116 represents a video processing portion that processes M, C, Y and K video signals supplied through an original-document reader or an external I/F so as to form a laser beam signal, the pulse width of which has been modulated.

Figure 3:
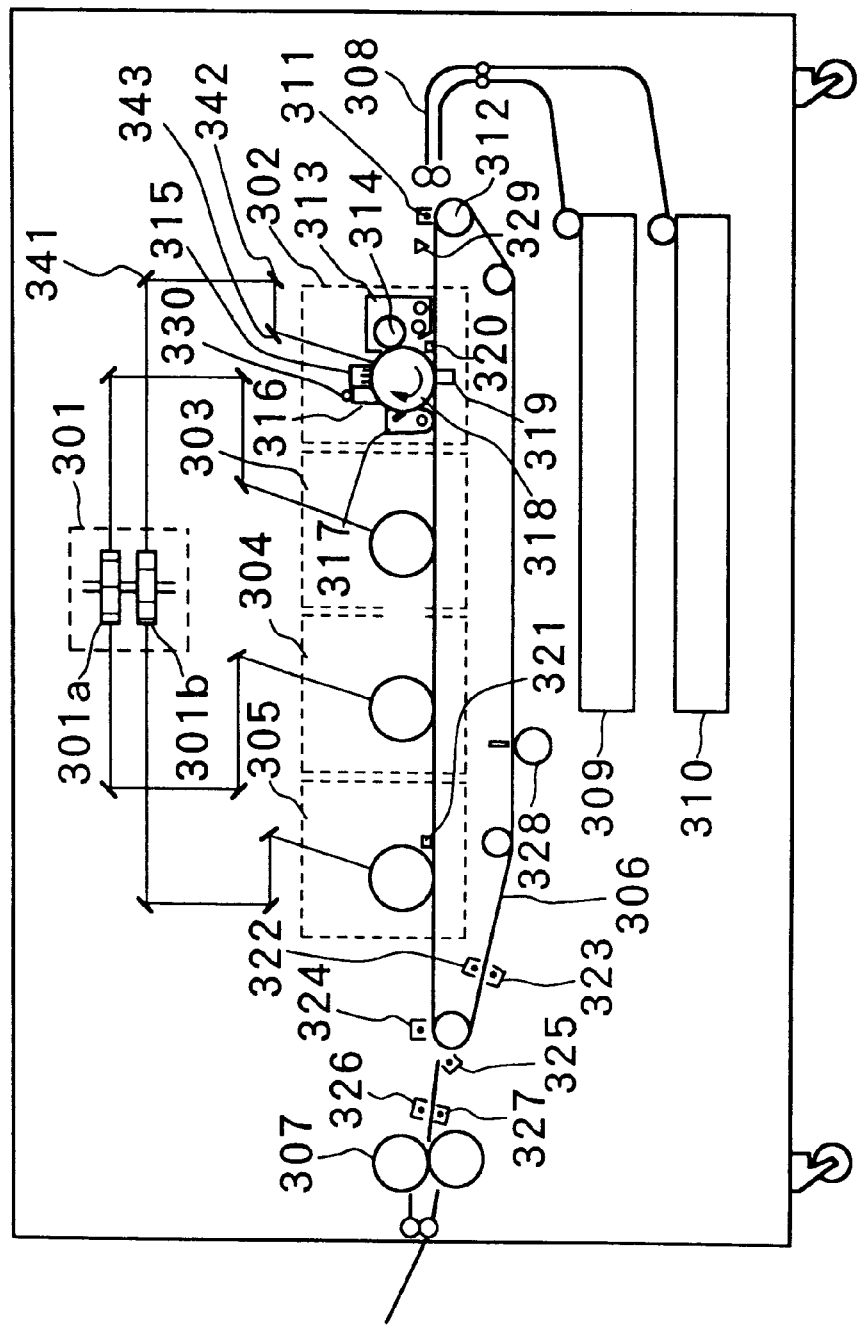
FIG. 3 is a cross sectional view showing an essential portion of a multi-color electrophotographic printer according to the first embodiment.

Reference numeral 117 represents a printer control portion for controlling a printer sequence for components for operating the printer shown in FIG. 3, the components being consisting of a variety of motors, a solenoid and a clutch. The printer control portion 117 generates a developing bias to be supplied to a developing sleeve 314 and charged voltage to be supplied to a variety of chargers, such as a transfer charger 319. Reference numeral 118 represents a CPU portion for controlling the total operation of the printer.

<Video Processing Portion>

In the video processing portion 116, M, C, Y and K video signals MRV, CRV, YRV and KRV (hereinafter abbreviated to "RV") supplied from, for example, a reader portion (omitted from illustration) to the printer are latched by a flip flop (F.F) 101, and then supplied to a lookup table (LUT) 105 for the respective colors. The LUT 105 comprises a RAM, on which gamma characteristics for the printer are previously written by, for example, the CPU portion 118, so that desired input and output characteristics are obtained. Thus, the video signals for the foregoing colors and supplied to the LUT 105 are gamma-corrected for the respective colors.

Magenta and cyan video signals are supplied to FiFo memories 106 and 107 and yellow and black video signals are supplied to LiFo memories 108 and 109 after they have been gamma-corrected by the LUT 105. When the level of main scan synchronizing signal RSYNC* in the reader portion is low, the writing address of the FiFo memory or the LiFo memory is reset. When the level of main scan video enable signal PVE * in the reader portion is low, the color video signals are respectively written on the FiFo memories 106, 107, the LiFo memories 108 and 109.

When the level of the main scan synchronizing signal PSYNC * for each of the independent colors in the printer portion is low, the reading address counters of the FiFo memory and the LiFo memory adapted to the corresponding colors are reset. When the level of the video enable signal PVE * for each of the independent colors in the printer portion is low, video signal PV for each of the independent colors is, in synchronization with pixel clock for each of the independent colors corresponding to the video signals for the respective colors in the printer portion, read from the FiFo memories 106 and 107 or the LiFo memories 108 and 109 adapted to the corresponding colors. The video signals are read in such a way that magenta and cyan images are read in the form of a normal image and yellow and black images are read in the form of a mirror image, the thus-read video signal being then supplied to a laser control portion 111. The video signals for the respective colors supplied to the laser control portion 111 are converted into M, C, Y and K analog video signals by high-speed D/A converter for each of the independent colors, and then the pulse width of the video signals are converted by a pulse width modulation (PWM) unit for each of the independent colors before they are supplied to a laser driver circuit for each of the independent colors. In the laser driver circuit, four semiconductor laser units are operated in response to the M, C, Y and K video signals supplied from the PWM unit for each of the independent colors so that laser beams corresponding to the M, C, Y and K images are generated.

A polygonal scanner 301 shown in FIG. 3 is irradiated with the laser beams generated in the video processing portion 116 so that the upper surface of a photosensitive drum for each of the independent colors is scanned. The laser beams for the respective colors are detected by laser detection portions 112 to 115 constituted by light receiving devices, such as photodiodes so as to be supplied, as laser detection signals BD for the respective colors, to a synchronization control portion 110. In the synchronization control portion 110, the main scan synchronizing signals PSYNC * respectively for M, C, Y and K in the printer portion and pixel clocks PCLK respectively for M, C, Y and K are generated in response to the supplied BD signals for the respective colors. Further, the main scan video enable signal PVE * for each of the independent colors is generated in response to the BD signal.

<Structure of Printer>

FIG. 3 is a cross sectional view showing an essential portion of a multi-color electronic printer (hereinafter called a "color printer") to which the present invention is applied. Referring to FIG. 3, reference numeral 301 represents a polygonal scanner for scanning the surface of the photosensitive drum with the laser beams generated in the video processing portion 116 shown in FIG. 1. Reference numeral 302 represents a cyan (C) image forming portion which is the first stage of the polygonal scanner, and 303, 304 and 305 are magenta (M), yellow (Y) and black (K) image forming portions each having a similar structure.

In the image forming portion 302, reference numeral 318 represents a photosensitive drum for forming a latent image when it is exposed to the laser beam, 313 represents a developing unit for developing the latent image on the photosensitive drum 318 by using toner. Reference numeral 314 represents a sleeve disposed in the developing unit 313 to apply the developing bias so as to develop the latent image with the toner. Reference numeral 315 represents a primary charger for charging each of the photosensitive drums 318 to a desired potential. Reference numeral 317 represents a cleaner for cleaning the surface of the photosensitive drum 318 after the transference has been performed. Reference numeral 316 represents a sub-charger that removes electricity from the surface of the photosensitive drum 318 cleaned by the cleaner 317 so as to cause the primary charger 315 to be charged satisfactorily. Reference numeral 330 represents a pre-exposure lamp for removing residual charge on the photosensitive drum 318. Reference numeral 319 represents a transference charger that performs discharging from the rear side of a transference belt 306 to transfer the toner image on the photosensitive drum 318 to a transfer member.

Reference numerals 309 and 310 represent cassettes for respectively accommodating the transfer members, and 308 represents a paper supply portion for supplying the transfer members from the cassettes 309 or 310. Reference numeral 311 represents an adsorbing charger for causing the transfer member supplied by the paper supply portion 308 to be adsorbed by the transference belt 306. Reference numeral 312 represents transference belt rollers for use to rotate the transference belt 306 and causes the transfer member to be adsorbed and charged by the transference belt 306 in cooperation with the adsorbing charger 311.

Reference numeral 324 represents an electricity-removing charger for facilitating separation of the transfer member from the transference belt 306. Reference numeral 325 represents a separation charger for preventing deformation of the image undergoing due to separation charge occurring when the transfer member is separated from the transference belt 306. Reference numerals 326 and 327 represent pre-fixation chargers for compensating the adsorbing force of the toner on the transfer member after the separation has been performed to prevent the deformation of the formed image. Reference numerals 322 and 323 represent transference belt chargers for removing electricity from the transference belt 306 to electrostatically initialize the transference belt 306. Reference numeral 328 represents a belt cleaner for removing contamination of the transference belt 306.

Reference numeral 307 represents a fixer for thermally fixing the toner image, which has been again charged by the pre-fixation chargers 326 and 327, onto the transfer member.

Reference numeral 329 represents a sensor for sensing the paper leading portion for detecting the leading portion of the transfer member supplied onto the transference belt 306 by the paper supply portion 308. A detection signal supplied from the sensor 329 for sensing the paper leading portion is transmitted from the printer portion to the reader portion so as to be used as a sub-scan synchronizing signal when the video signal is supplied from the reader portion to the printer portion.

A method of scanning an image according to the first embodiment will now be described. The description will be made with reference to the cyan image forming portion. The laser beam modulated to correspond to image data is scanned at high speed by the polygonal scanner 301 capable of rotating at high speed, and then reflected by mirrors 341 to 343 so that the surface of the photosensitive drum 318 is exposed in the form of dots corresponding to the image. One horizontal scan of the laser beam corresponds to one horizontal scan operation of the image. Since the photosensitive drum 318 is being rotated at constant speed at this time, plane images are sequentially exposed in the main scanning direction due to the foregoing scan with the laser beams and in the sub-scanning direction due to the constant-speed rotations of the photosensitive drum 318.

In the first embodiment, the polygonal mirror 301 consisting of two stages of polygonal mirrors disposed coaxially as shown in FIG. 3 is provided. An upper polygonal mirror 301a scans, with the laser beams, second and third image forming portions when viewed in the descending order from the upstream position in the direction in which the transfer member is conveyed, that is, the M and Y image forming portions 303 and 304. The lower polygonal mirror 301b scans, with the laser beams, first and fourth image forming portions, that is, the C and K image forming portions 302 and 305. Namely, the laser beams for forming M and Y images are used to scan by the upper polygonal mirror 301a, while the laser beams for forming C and K images are used to scan by the lower polygonal mirror 301b. As a result, the surfaces of the photosensitive drums are exposed in the form of dots corresponding to the images in the respective colors.

In the first embodiment, a polygonal mirror having eight planes is used as the upper polygonal mirror 301a and a polygonal mirror having nine planes is used as the lower polygonal mirror 301b for the purpose of having a plurality of sub-scanning densities that are varied to correspond to the respective colors.

In the first embodiment, the frequency at which the upper and lower polygonal mirrors are rotated is set to 274.3 Hz. Furthermore, the process speed, which is the rotational speed of each of the photosensitive drums for the respective colors or the speed at which the transfer member is conveyed, is set to 100 mm/sec. As a result of the thus-made setting, the sub-scanning density for the image in each color is made such that the speed of the magenta and yellow images formed by using the upper polygonal mirror is 557 DPI and that of the cyan and black images formed by using the lower polygonal mirror is 627 DPI. Then, the main scanning operation with the laser beams will now be described.

The polygonal mirror having eight planes is used to perform laser beam scanning for M and Y images and the polygonal mirror having nine planes is used to perform laser bean scanning for C and K images as described above. Therefore, the laser detection portions 112 to 115 detect the laser beams such that the laser beams for M and Y images having a frequency of 2194 Hz corresponding to each of the planes of the polygonal mirror are detected and those for C and K images having a frequency of 2469 Hz are detected. Then, the laser detection signal BD for each of the independent colors is supplied to the synchronization control portion 110.

As described above, in the synchronization control portion 110, the main scan synchronizing signals PSYNC * respectively for M, C, Y and K in the printer portion and reference clocks PCLK respectively for M, C, Y and K are generated in response to the supplied BD signal for each of the independent colors. Further, the main scan video enable signal PVE * for each of the independent colors is generated in response to the BD signal.

In the first embodiment, the frequency of the reference clock PCLK is varied for each color to correspond to the main scanning frequency and the sub-scanning density that corresponds to the main scanning frequency. Similarly, the main scan video enable signal PVE * is made to be different for each color.

Figure 4:
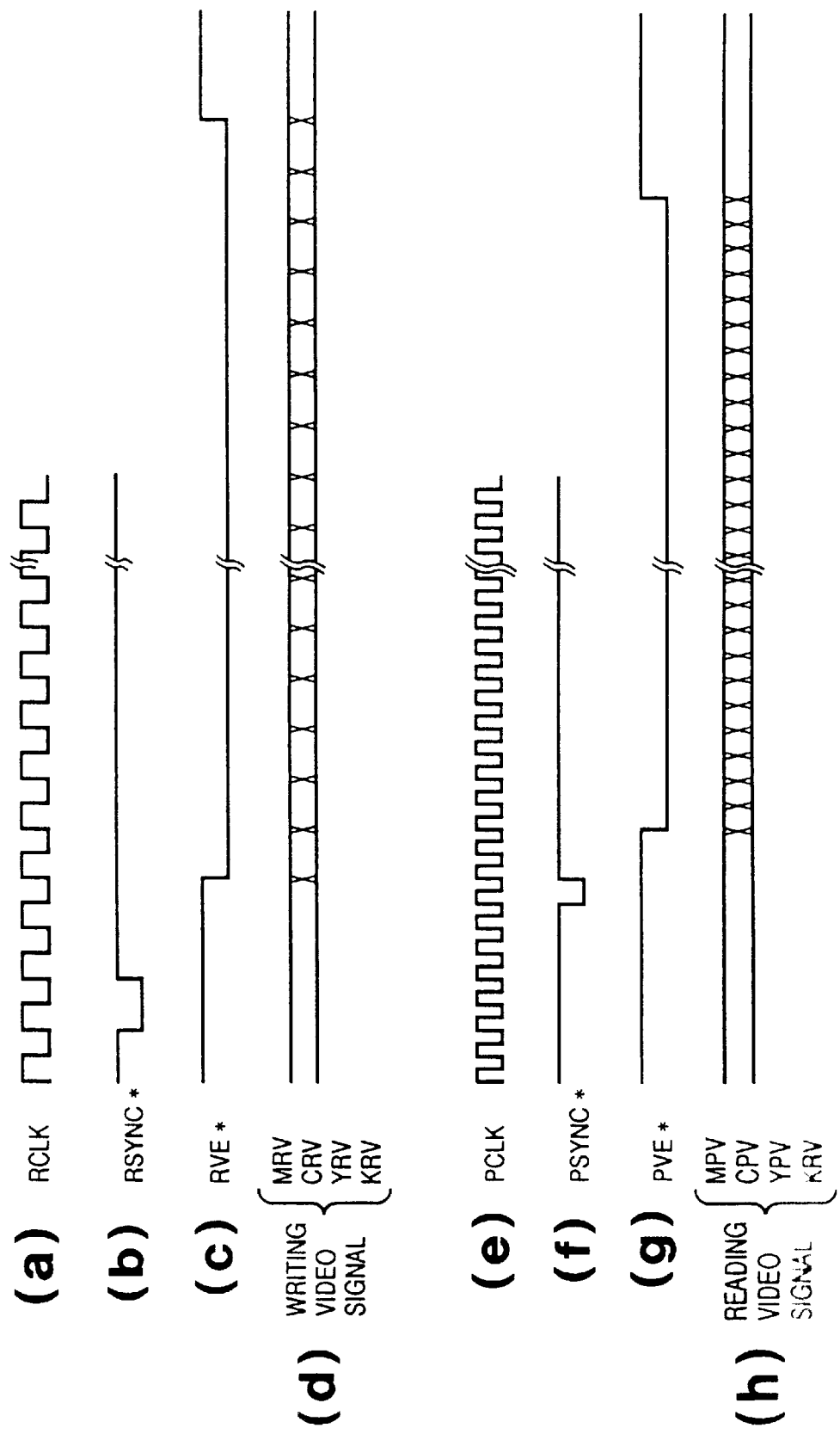
FIG. 4 is a timing chart of signals for use in a main scanning operation.

FIG. 4 is a timing chart of each signal for use in the main scanning operation. The main scanning operation will now be described with reference to FIG. 4.

In the first embodiment, the frequency of the reference clock PCLK for M and Y, that is, the frequency of MPCLK and YPCLK is set to 2.74 MHz, while that for C and K, that is, the frequency of CPCLK and KPCLK is set to 3.46 MHz. In the structure of the laser beam scanning optical system according to the first embodiment, the frequency of the reference clock PCLK for each color is set to the foregoing value to correspond to the main scanning frequency as described above so that the main scanning density is made to be the same as the sub-scanning density, namely, that for M and Y images is set to 557 DPI and that for C and K images is set to 627 DPI. Similarly, the main scan video enable signal PVE * is made to be different for each color to correspond to the structure of the laser beam scan optical system or the main scanning frequency.

The dot exposure corresponding to image signals will now be described.

As described, the first embodiment has the arrangement that the sub-scanning recording frequency and the scanning density for M and Y images are respectively set to 2194 Hz and 557 DPI and those for C and Bk images are set to 2468 Hz and 627 DPI. Furthermore, the main scanning recording frequency and the scanning density for M and Y images are respectively set to 2.74 MHz and 557 DPI and those for C and Bk images are set to 3.46 MHz and 627 DPI. In the first embodiment, image dot exposure patterns for respective colors are formed in accordance with the foregoing reference recording frequencies and the reference scanning densities.

Figure 5:
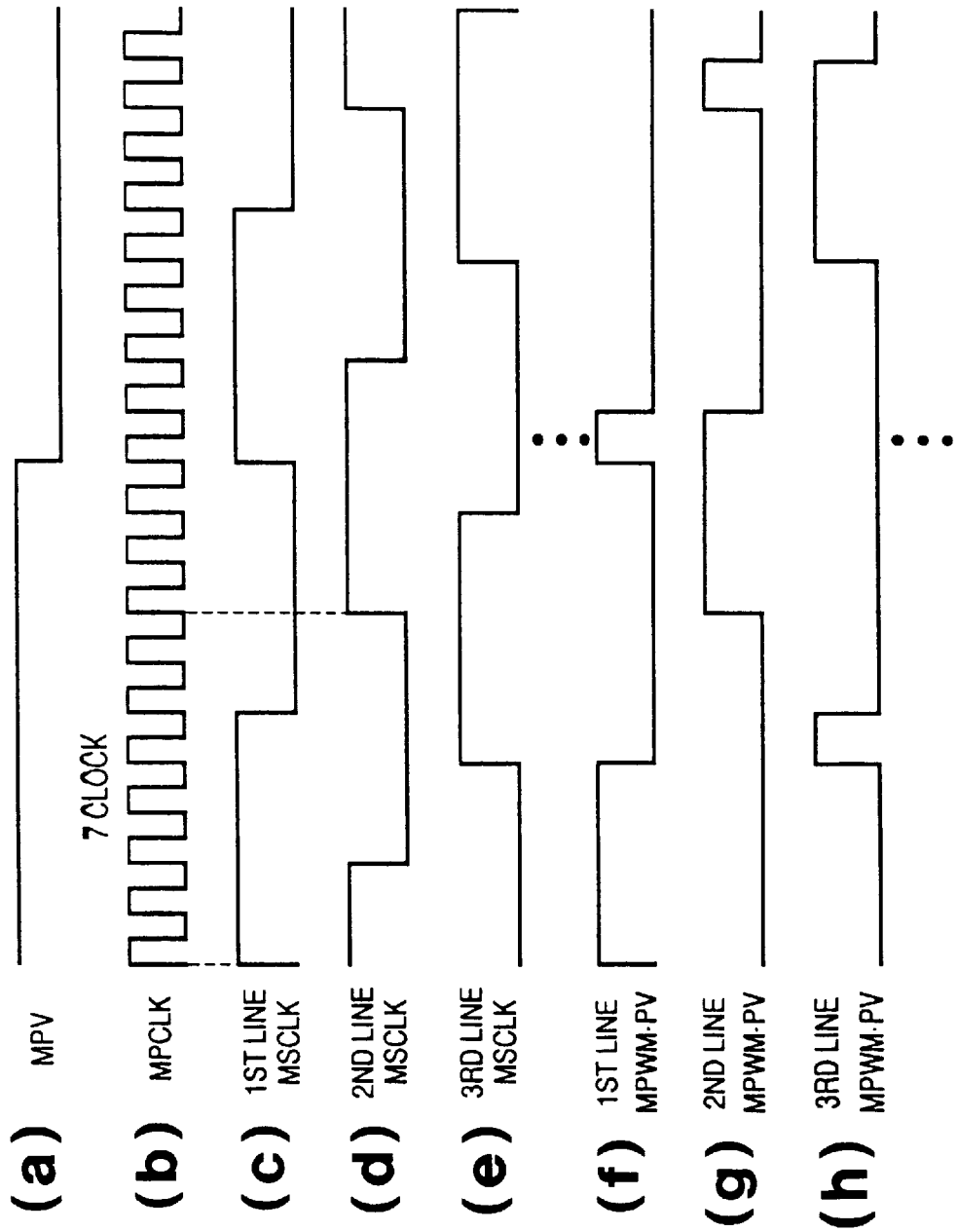
FIG. 5 is a chart showing the timing of main scan of a magenta image in a laser control portion.
Figure 6:
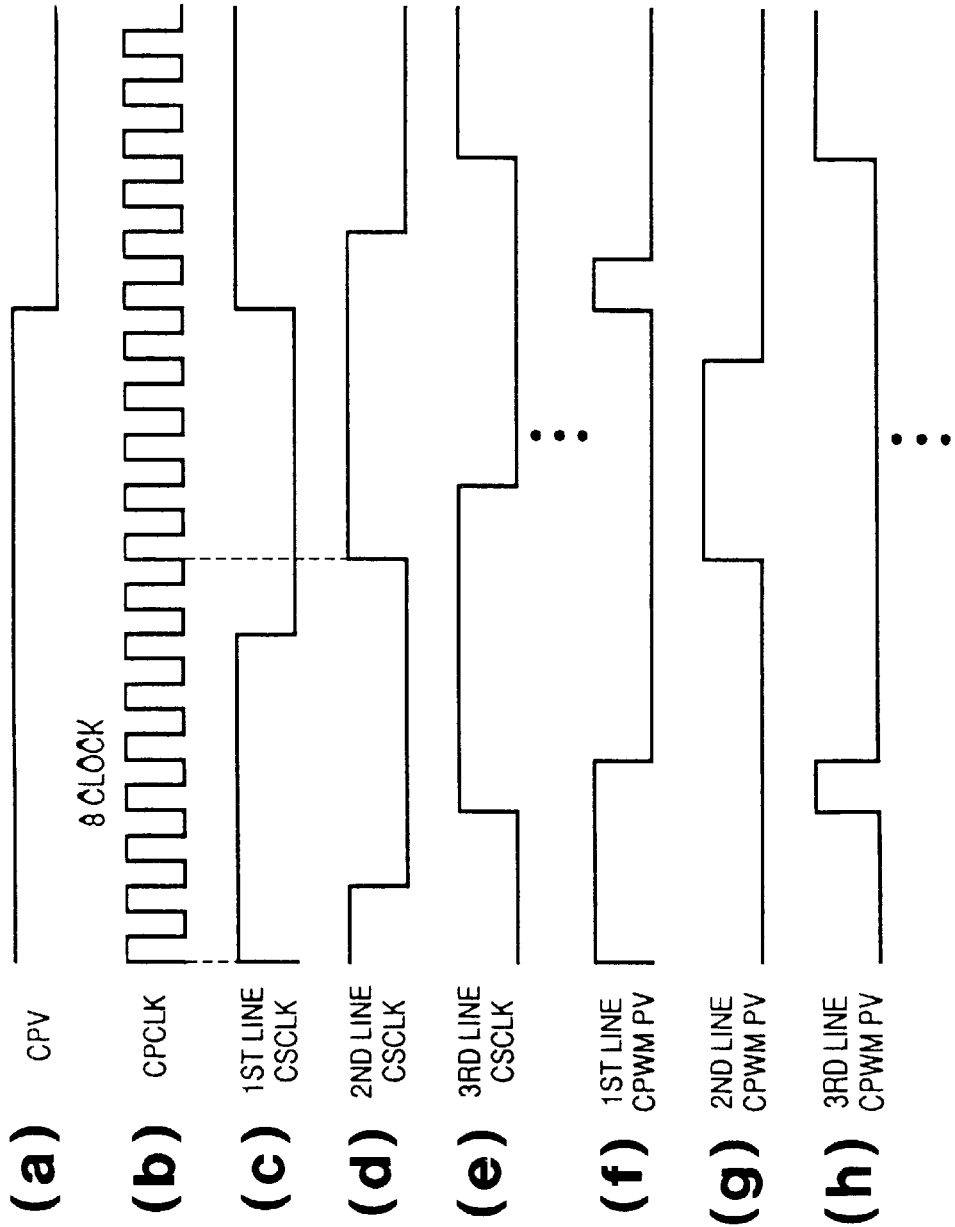
FIG. 6 is a chart showing the timing of main scan of a cyan image in the laser control portion.
Figure 7:
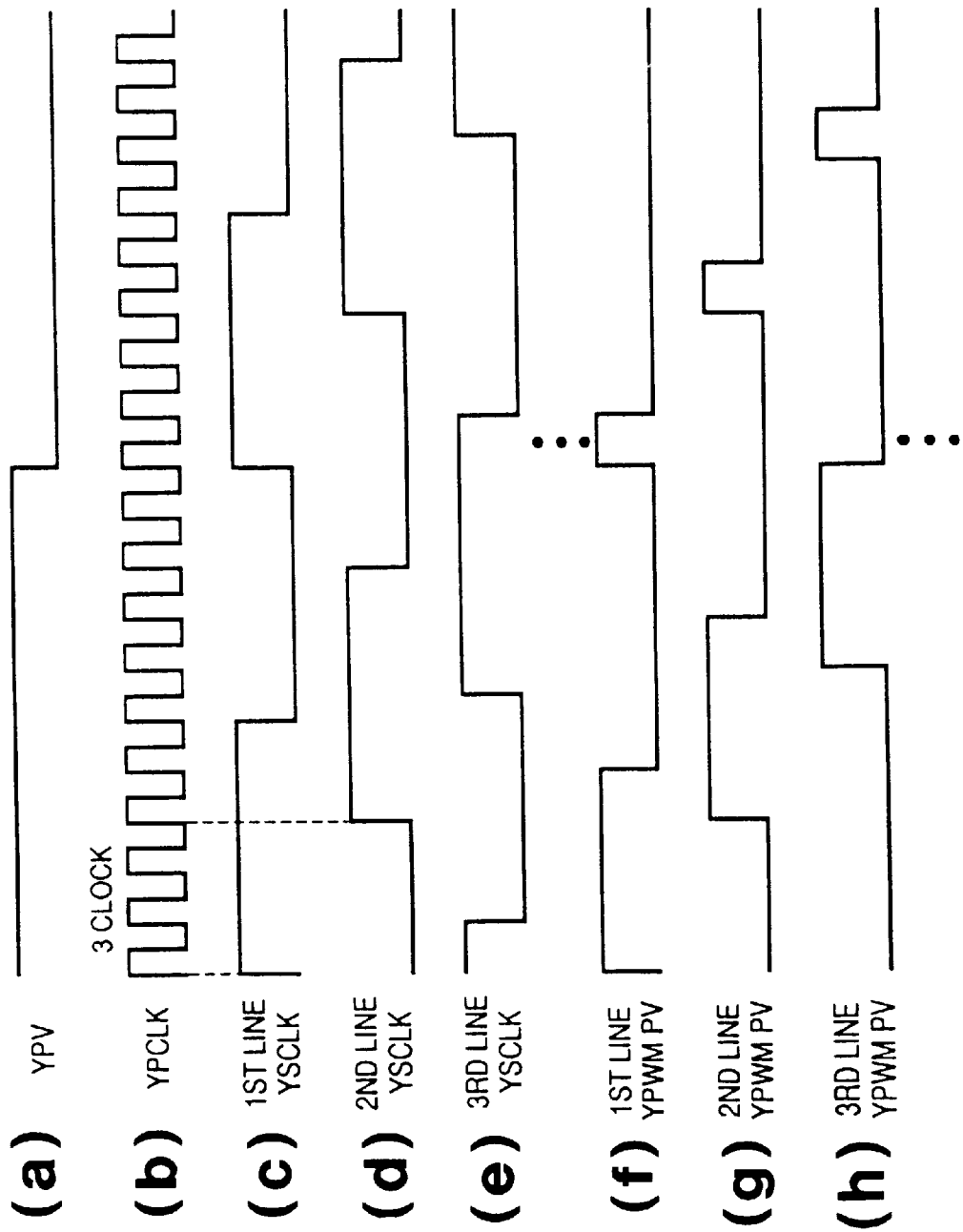
FIG. 7 is a chart showing the timing of main scan of a yellow image in the laser control portion.

FIGS. 5 to 8 show the main scanning timing for each color in the laser control portion 111. As for M and Y images in the first embodiment, the main scanning reference clock 2.74 MHz is made to be the reference frequency and screen clocks MSCLK and YSCLK each having a frequency of 274 KHz, which is one-tenth of the reference frequency, are generated. While corresponding to the frequency of MSCLK and YSCLK, the pulse width of the supplied analog video signal is modulated. One period of the screen clocks corresponds to one of a sawtooth waveform used for a pulse-width modulating (PWM) method. The PWM method is disclosed in, for example, U.S. Pat. No. 4,980,757, however, it is not limited to the disclosed method. In response to the video signal having the modulated pulse width, the M and Y semiconductor lasers are operated so that the surfaces of the photosensitive drums are exposed to correspond to the image signals. Simultaneously, the phase of each of the screen clocks MSCLK and YSCLK is shifted for each one main scanning line. Namely, as for MSCLK, it is shifted by seven periods of reference clock MPCLK for each main scanning line as shown in FIG. 5. As for YSCLK, it is shifted by three periods of reference clock YPCLK for each main scanning line as shown in FIG. 7.

Figure 8:
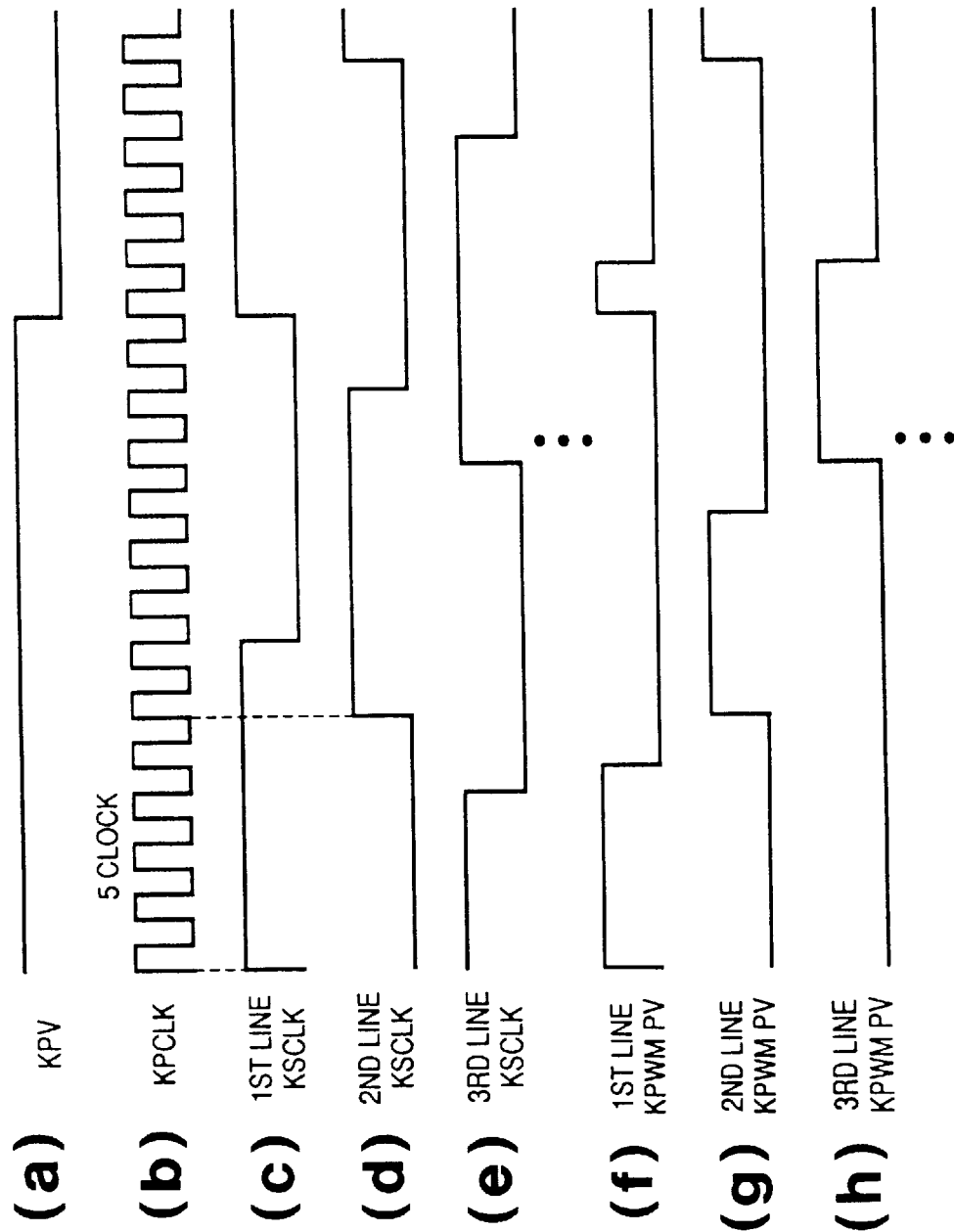
FIG. 8 is a chart showing the timing of main scan of a black image in the laser control portion.

Similarly, as for C and Bk images, the main scanning recording frequency 3.46 MHz is made to be the reference frequency and screen clocks CSCLK and KSCLK each having a frequency of 266 KHz, which is one-thirteenth of the reference frequency, are generated. While corresponding to the frequency of CSCLK and KSCLK, the pulse width of the supplied analog video signal is modulated. In response to the video signal having the modulated pulse width, the C and K semiconductor lasers are operated so that the surfaces of the photosensitive drums are exposed to correspond to the image signals. Simultaneously, the phase of each of the screen clocks CSCLK and KSCLK is shifted for each one main scanning line. Namely, as for CSCLK, it is shifted by eight periods of reference clock CPCLK for each main scanning line as shown in FIG. 6. As for KSCLK, it is shifted by five periods of reference clock KPCLK for each main scanning line as shown in FIG. 8.

Figure 9:
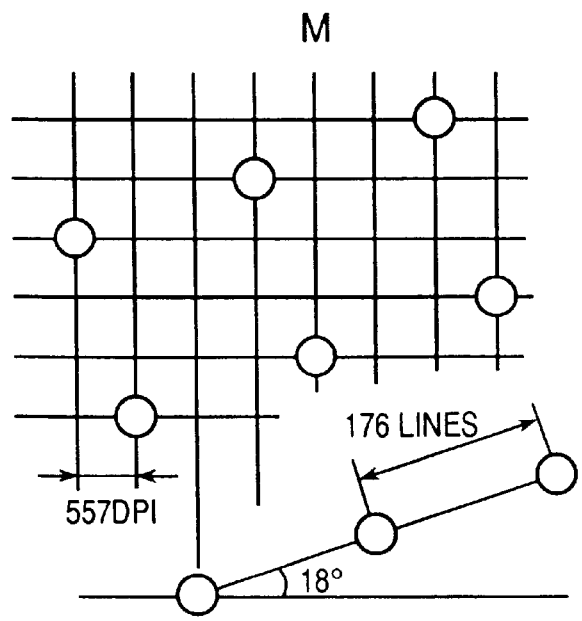
FIG. 9 is a diagram showing an image dot forming pattern of an output magenta image.

FIGS. 9 to 12 show formed image dot patterns for respective colors of an output image when the pixel dot exposure has been performed as described above. FIG. 9 shows a case where a magenta image is formed. By controlling the pixel dot exposure timing in accordance with the reference recording frequency of 557 DPI in the main scanning direction and the sub-scanning direction, an image including 176 lines and a screen angle of 18° is formed as shown in FIG. 9.

Figure 10:
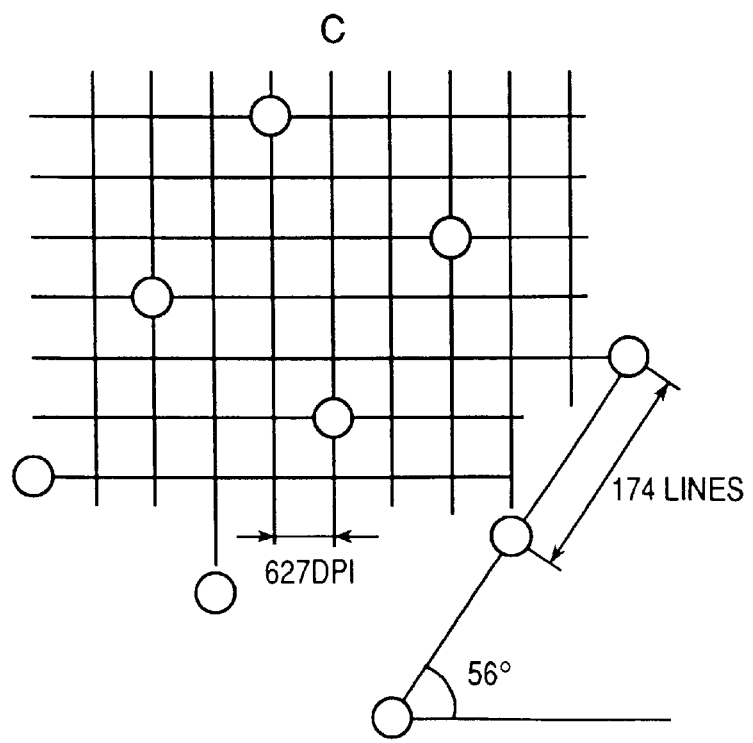
FIG. 10 is a diagram showing an image dot forming pattern of an output cyan image.

Similarly, FIG. 10 shows a case where a cyan image has been formed. In this case, an image including 174 lines and a screen angle of 56° is formed in accordance with the reference recording period of 627 DPI in the main scanning direction and the sub-scanning direction.

Figure 11:
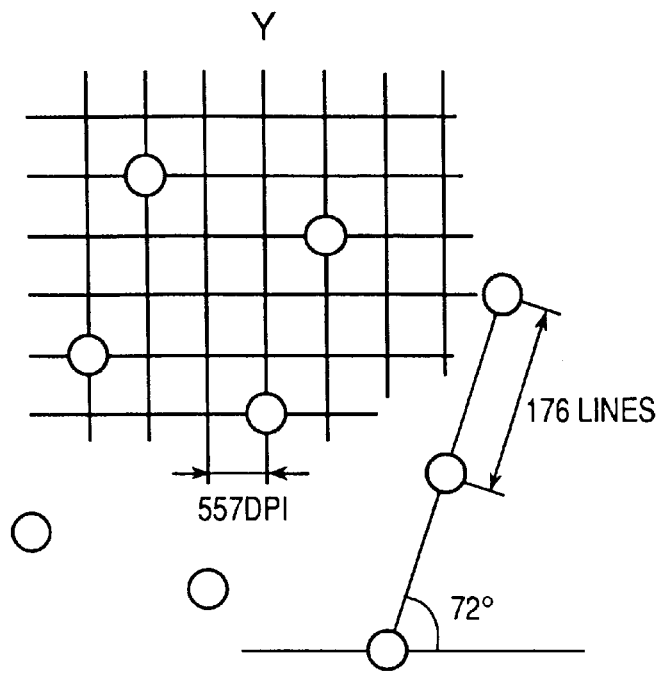
FIG. 11 is a diagram showing an image dot forming pattern of an output yellow image.

FIG. 11 shows a case where a yellow image has been formed. In this case, an image including 176 lines and a screen angle of 72° is formed in accordance with the reference recording period of 557 DPI in the main scanning direction and the sub-scanning direction.

Figure 12:
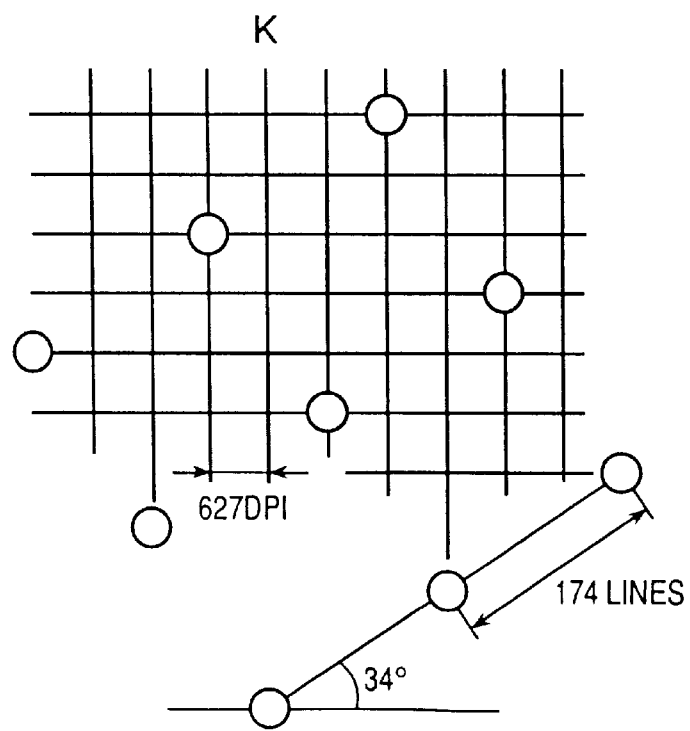
FIG. 12 is a diagram showing an image dot forming pattern of an output black image.

FIG. 12 shows a case where a Bk image has been formed. In this case, an image including 174 lines and a screen angle of 34° is formed in accordance with the reference recording period of 627 DPI in the main scanning direction and the sub-scanning direction.

Since the first embodiment has the arrangement that the plural recording periods are provided for respective colors in the main scanning direction and the sub-scanning direction, a multi-color image having the number of the screen lines and screen angles for respective colors as shown in FIG. 13 can be formed. By combining the number of the screen lines and the screen angles for respective colors at the time of use, color shade or generation of moire fringes mainly caused from deviation of the recording position for each color can be prevented. Furthermore, deterioration of the image quality occurring due to generation of peculiar texture pattern and to worsening of the resolution can be prevented and therefore satisfactory excellent image quality can be obtained.

That is, the arrangement that the screen angle among M, C, Y and Bk is set to be 15° or more prevents the generation of the moire fringes occurring due to the color interference. Furthermore, a different screen angle is respectively made for each color from screen angles, for example, Y15°, M30°, C60° and K90°, which are usually used in printing or the like to cope with a case where a printed image or the like is used as an original document so that generation of moire fringes taking place due to interference with the image of the original document is prevented. Furthermore, the number of the screen lines for M, C, Y and Bk is set to substantially 175 and the screen angle of each color is set to the angle which is different from the screen angle of the original document so that generation of a peculiar texture pattern visually striking in an image formed by superimposing the four colors can be prevented. In addition, interference with a halftone-dot image having 175 lines, which is used in general color printing, can be prevented most efficiently. Simultaneously, setting of the number of the line numbers to 175 prevents visual striking of each pixel and enables an image exhibiting excellent image quality capable of coping with high-quality paper such as coat paper or art paper can be reproduced.

<Modification of First Embodiment>

Although the first embodiment has the arrangement that the number of the screen lines and the screen angle for each color are set as shown in FIG. 13, the present invention is not limited to the foregoing arrangement. The image forming conditions, such as the number of the planes of the polygonal mirror, the processing speed and the pixel clock, can be set arbitrarily. Thus, the optimum main and sub-scanning densities can be determined to achieve the object of the image forming apparatus and the number of the screen lines and the screen angle of a formed image can be set arbitrarily.

Although the first embodiment has the image forming conditions determined to form a square halftone dot screen neighboring dots are arranged so as to form a square, the present invention is not limited to this. By arbitrarily setting the image forming conditions, use of an underline screen or a halftone dot screen, such as a rhomboid halftone dot screen, permits the number of the screen lines and the screen angle to be set arbitrarily.

In the various image forming apparatuses to be described in the following embodiments, the image forming conditions may be set arbitrarily to be adaptable to each image forming apparatus such that the optimum main and sub-scanning densities can be set to be adaptable to the object of the image forming apparatus and the form of the screen for forming the image, the number of the screen lines and the screen angle can be set arbitrarily.

<Second Embodiment>

Figure 14:
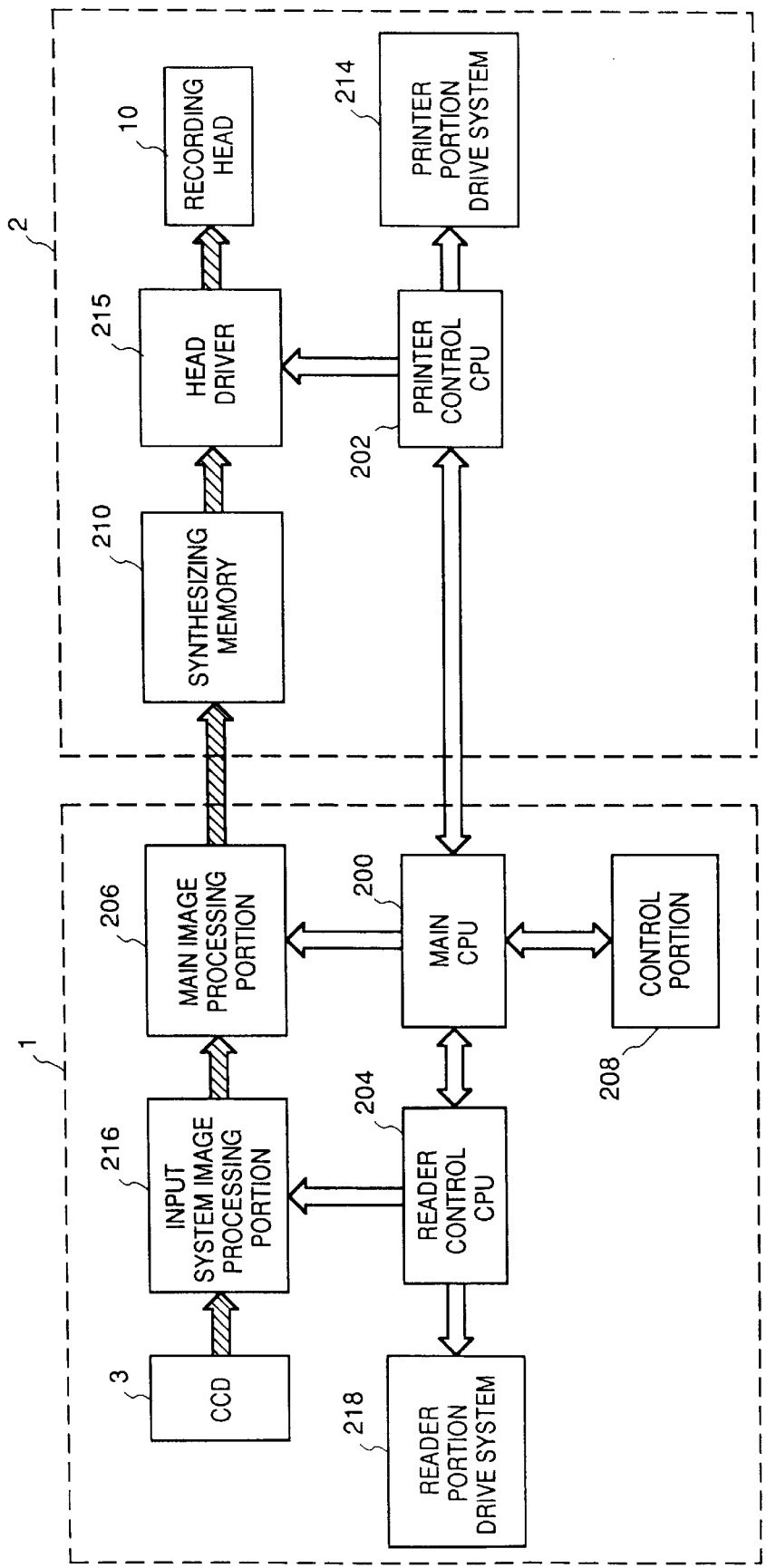
FIG. 14 is a schematic block diagram showing the structure of an image forming apparatus according to a second embodiment.

FIG. 14 is a schematic view of a structure for totally controlling an image forming apparatus according to a second embodiment. The apparatus, as shown in FIG. 14, comprises a color image scanner portion (hereinafter abbreviated to a "reader portion") 1 that reads the color image of an original document to output digital color image data and a printer portion 2 for recording the digital color image data outputted from the reader portion 1 on to the recording paper.

In the reader portion 1, an exposure lamp, a lens (each of which are omitted from illustration) and an image sensor 3 (the second embodiment employs a CCD sensor) capable of reading lines and images in a full color manner are used to read the image of an original document placed on a glass of an original-document frame. Furthermore, a main CPU 200 totally controls the apparatus. A printer control CPU 202 for controlling the printer portion 2, a reader control CPU 204 for performing the reading control operation, a main image processing portion 206 for performing a predetermined image processing operation and a control portion 208 serving as an input/output portion for an operator are connected to the main CPU 200.

The main image processing portion 206 perform image processing operations including masking, black extraction, multivalue-coding and γ-correction operations. Furthermore, a synchronizing memory 210 is connected to the printer control CPU 202 and the main image processing portion 206. The synchronizing memory 210 acts to absorb the time dispersion occurring in the input operation and to correct a delay undergoing due to the mechanical configuration of recording heads to be described later. The output from the synchronizing memory 210 is outputted to a recording head 10 due to control of the head driver 215 performed by the printer control CPU 202.

The printer control CPU 202 is connected to a printer portion drive system 214 for controlling the input operation of the printer portion 2.

On the other hand, the reader control CPU 204 is connected to an input-system image processing portion 216 for performing correction processes required in a reading system for performing shading correction, color correction and γ-correction operations and to a reader-portion drive system 218 for controlling the input drive of the reader portion 2.

In addition, a CCD sensor 3 is connected to the input-system image processing portion 216. The input-system image processing portion 216 is connected to the main image processing portion 206.

Figure 15:
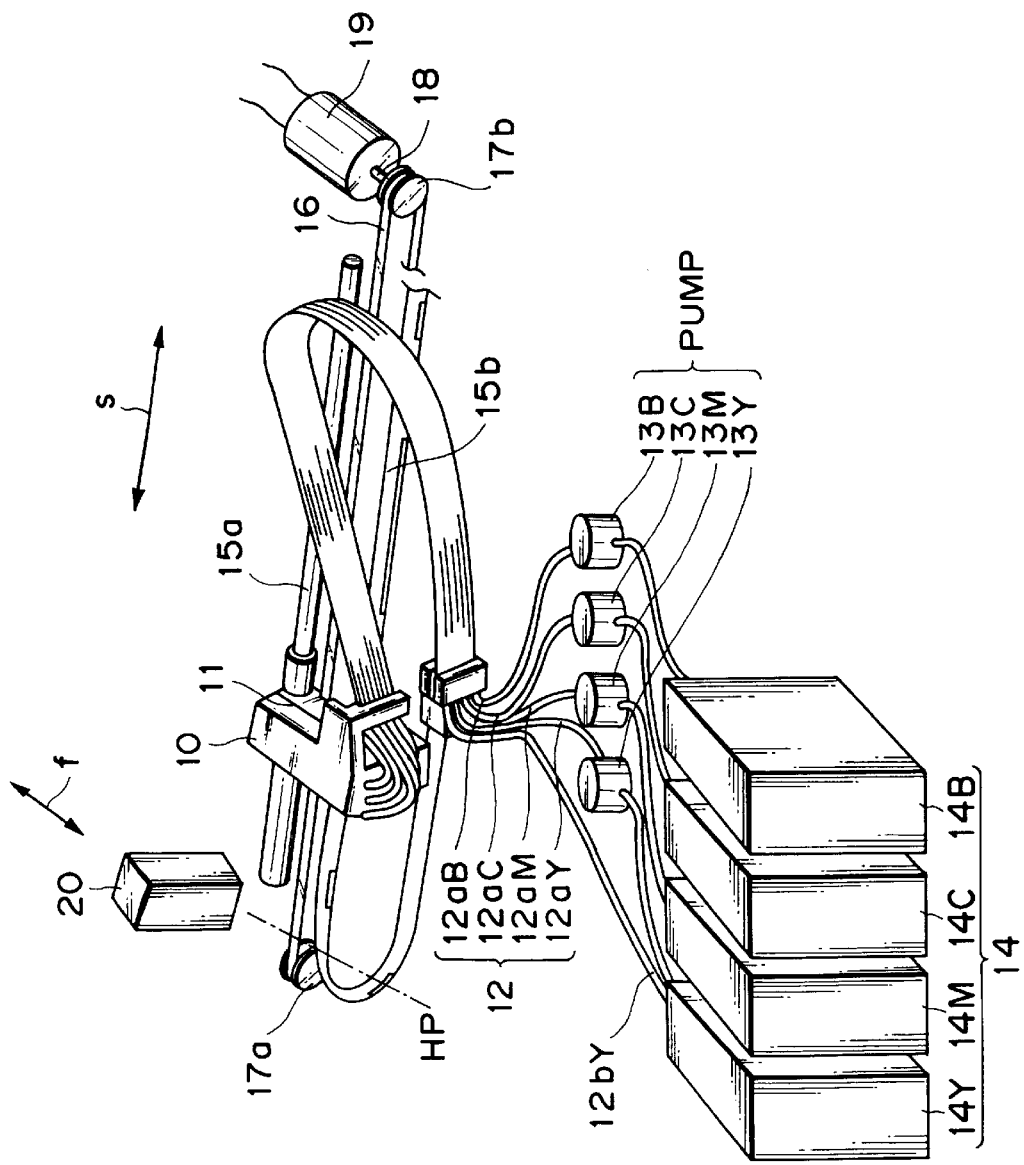
FIG. 15 is a schematic view showing an ink jet printer.

FIG. 15 is a diagram for illustrating the printer portion 2 of the image forming apparatus according to the second embodiment, wherein an ink jet printer is schematically illustrated. The printer portion 2 mainly consists of two guide rails 15a and 15b, an ink jet head 10, its carriage 11, an ink supply unit, a head recovery unit 20 and a transmission system (omitted from illustration).

As shown in FIG. 15, the ink supply unit stores an ink to supply it to the head 10 in a required quantity, the ink supply unit having an ink tank 14, an ink pump 13 and so forth. The ink supply unit and the head 10 are connected to each other by an ink supply tube 12 so that an ink in only a quantity that is usually discharged from the head 10 is automatically supplied to the head 10 due to the capillarity. When a head recovery operation to be described later is performed, the ink pump 13 is used so that the ink is forcibly supplied to the head 10.

The head 10 and the ink supply unit are mounted on the head carriage 11 and an ink carriage, respectively so as to be reciprocated in directions designated by an arrow S along the guide rails 15a and 15b by a belt 16 arranged between pulleys 17a and 17b which are driven by a shaft 18 of a motor 19 when the motor 19 is rotated.

The head recovery unit 20 is disposed to face the head 10 when the head 10 is positioned at its home position HP for the purpose of maintaining stability of the head 10. Specifically, the head recovery unit 20 performs operations as follows: when the apparatus is not operated, the head recovery unit 20 is moved forwards in a direction as designated by an arrow f to cap the head 10 at the home position HP (a capping operation) in order to prevent ink evaporation from the head nozzle. Furthermore, when the following required operation is performed such that air bubbles or dust in the nozzle is discharged by using the ink pump in such a way that the ink passage in the head 10 is pressurized to forcibly discharge the ink from the nozzle, the head recovery unit 20 acts to recover the discharged ink.

Figure 16:
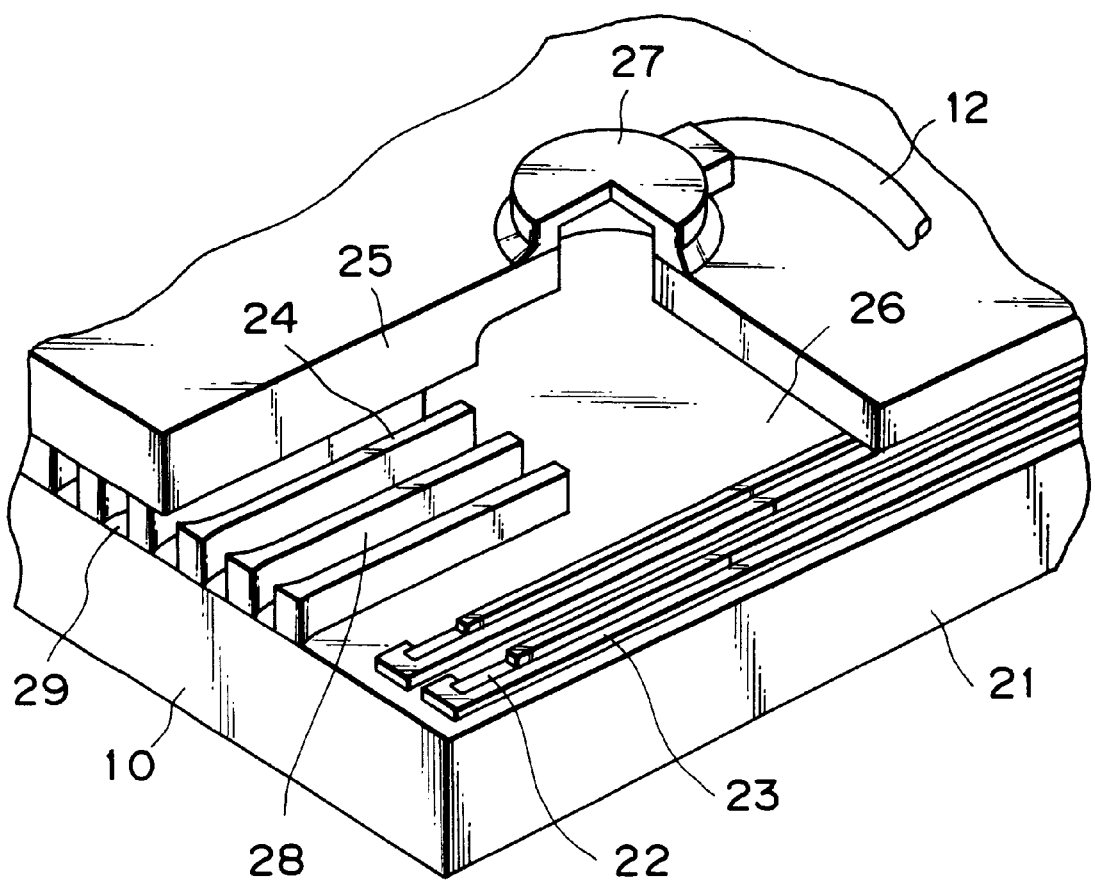
FIG. 16 is a perspective view showing the schematic structure of an ink jet recording head.
Figure 17:
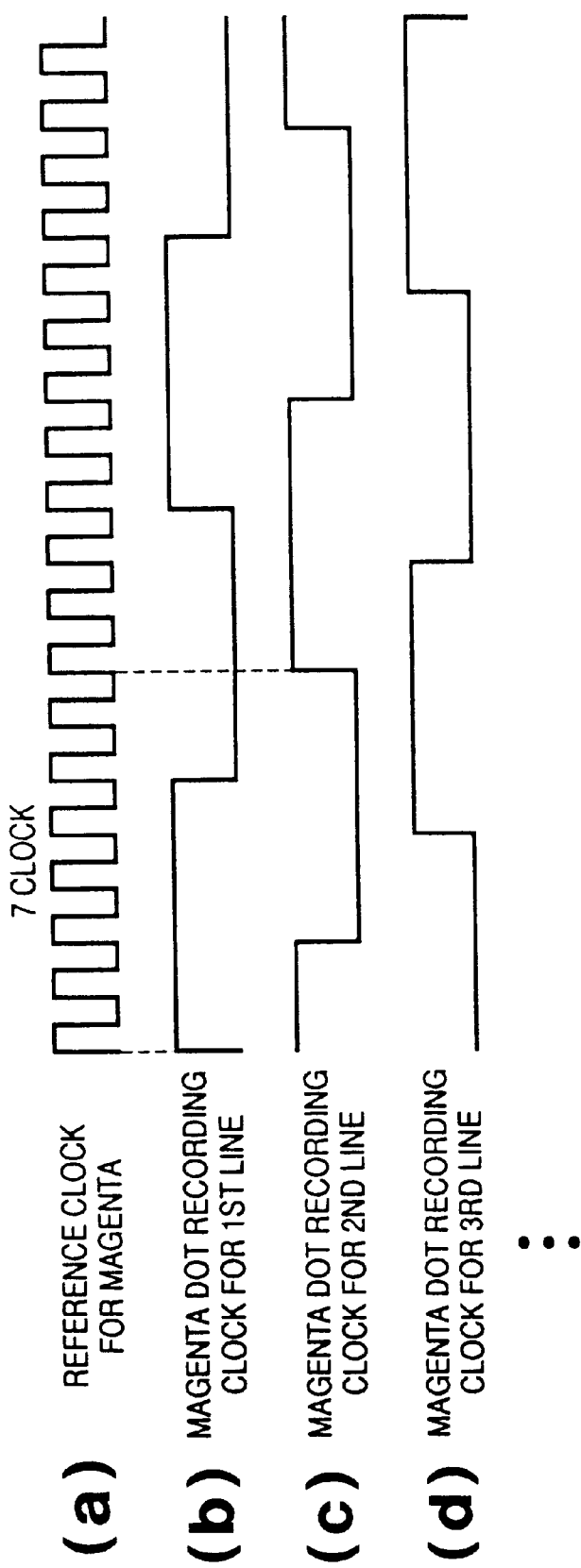
FIG. 17 is a chart showing the timing of main scan of a magenta image in a head driver.
Figure 18:
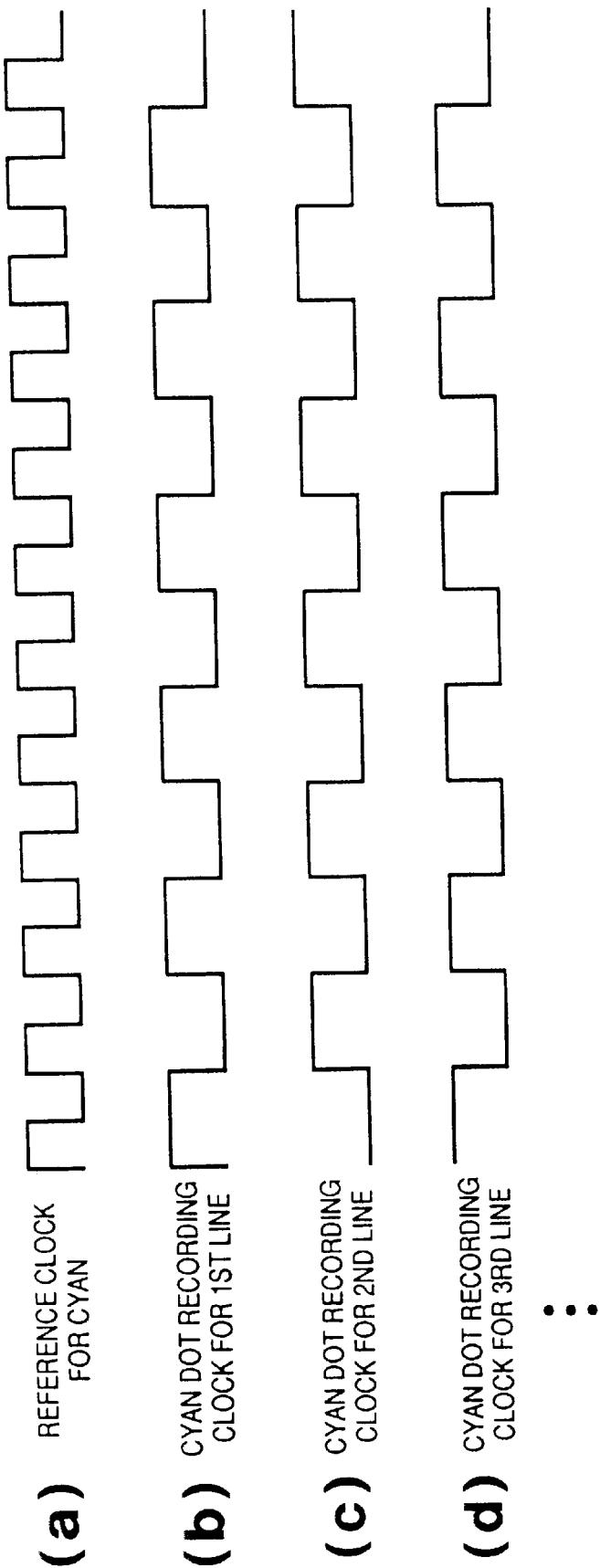
FIG. 18 is a chart showing the timing of main scan of a cyan image in the head driver.
Figure 19:
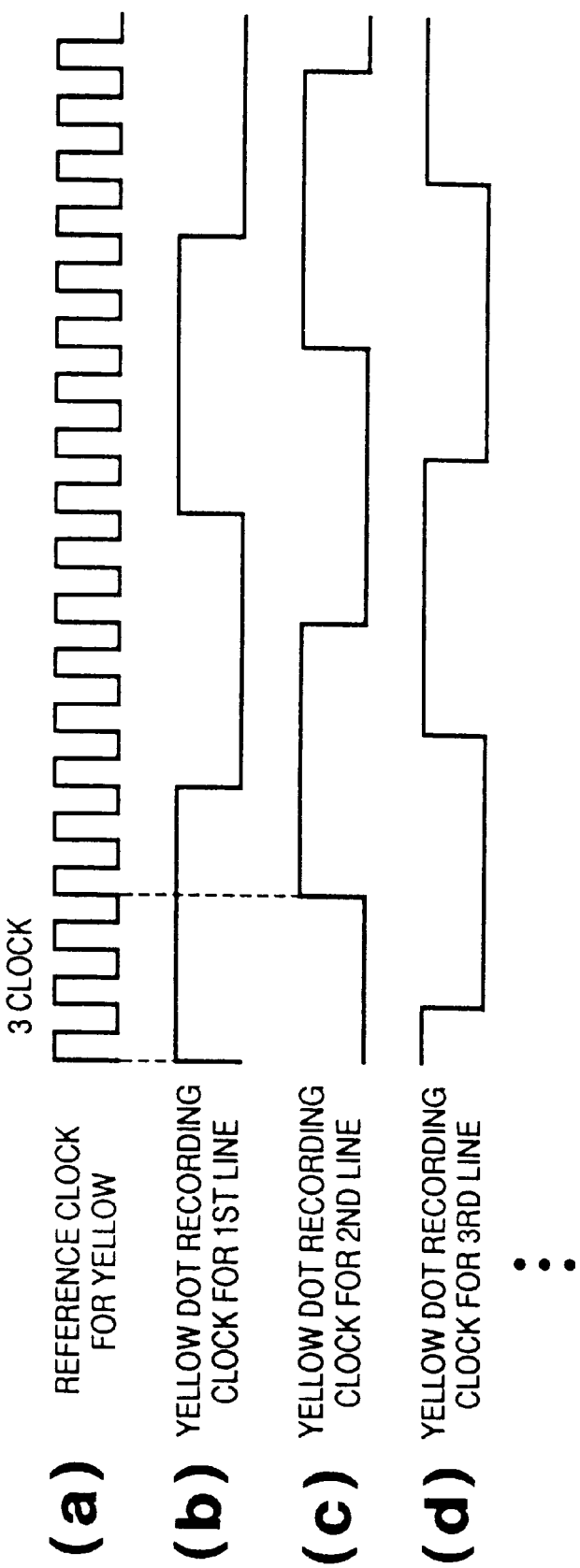
FIG. 19 is a chart showing the timing of main scan of a yellow image in the head driver.
Figure 20:
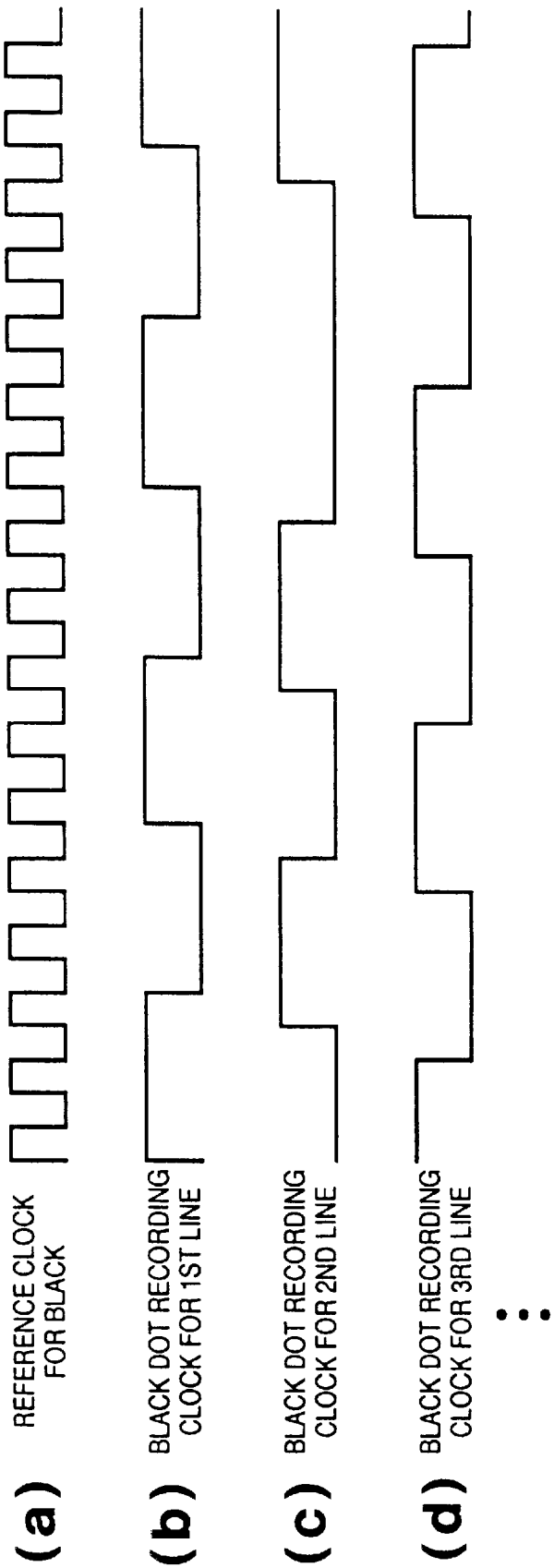
FIG. 20 is a chart showing the timing of main scan of a black image in the head driver.

FIG. 16 is a perspective view showing the schematic structure of the ink jet recording head 10. The ink jet recording head 10 is manufactured by a semiconductor manufacturing process step including etching, evaporating and sputtering processes and consisting of an electricity-to-heat converter 22, an electrode 23, a nozzle wall 24 and a ceiling plate 25 formed on a substrate 21.

The recording ink is supplied from the ink tank 14 into a common liquid chamber 26 in the recording head 10 through the ink supply tube 12. Reference numeral 27 represents a connector for the supply tube 12. The ink supplied into the common liquid chamber 26 is, due to the capillarity, supplied into a nozzle 28 and is stably held because it forms a meniscus on the surface of the discharge port at the leading portion of the nozzle 28. When electric power is supplied to the electricity-to-heat converter 22, the ink on the surface of the electricity-to-heat converter 22 is heated and an expansion phenomenon takes place. The energy of the expansion discharges an ink droplet through the surface 29 of a discharge port.

In the second embodiment, a structure of a multi-nozzle ink jet recording head is employed which comprises 128 or 256 nozzles disposed densely, the nozzles for respective colors having densities determined such that the density for the magenta nozzle is 474 DPI, that for the cyan nozzle is 212 DPI, that for the yellow nozzle is 474 DPI and that for the black nozzle is 335 DPI.

Also the second embodiment has the arrangement that the drive frequency for the recording head 10 determined in the head driver 215 is made to be different for each color in accordance with the movement of the carriage, that is, the main scan performed by the recording head 10 so that the recording density for each color is made to be different.

FIGS. 17 to 20 are timing charts showing the main scanning timing for each color set to the head driver 215.

In the second embodiment, the reference frequency generated for driving the recording head for each color, the pixel dot recording frequency of each head, and the quantity of shift for each main scan recording line, that is, the quantity of shift of the pixel dot recording phase corresponding to the reference drive period of the recording head are determined as follows.

Namely, magenta recording is set to 2.37 KHz, 231 Hz and shift of seven reference periods, cyan recording is set to 1.06 KHz, 530 Hz and shift of one reference period, yellow recording is set to 2.37 KHz, 237 Hz and shift of three reference periods, and black recording is set to 1.68 KHz, 336 Hz and shift of two reference periods.

Figure 21:
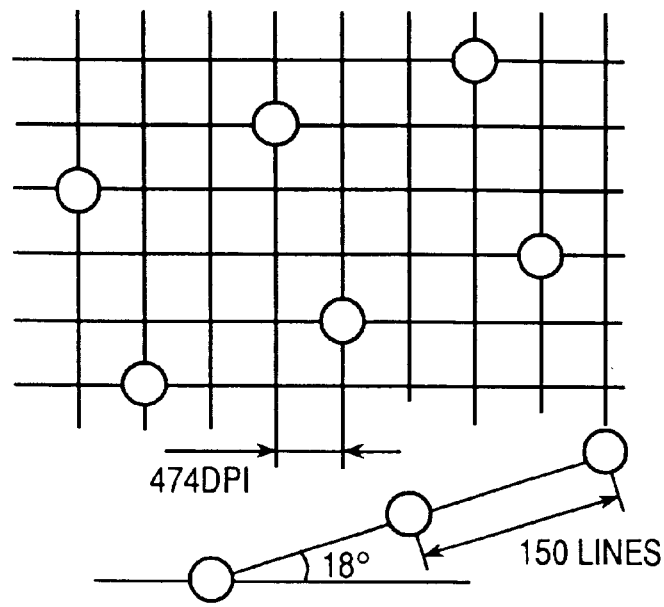
FIG. 21 is a diagram showing an image dot forming pattern of an output magenta image.

Formed image dot patterns of output images for the respective colors obtained by performing the pixel dot recording operation are shown in FIGS. 21 to 24. FIG. 21 shows magenta recording in which the pixel dot recording timing is controlled in accordance with a reference recording period of 474 DPI in the main and sub-scanning directions so that an image having 150 lines and a screen angle of 18° as shown in FIG. 21 is formed.

Figure 22:
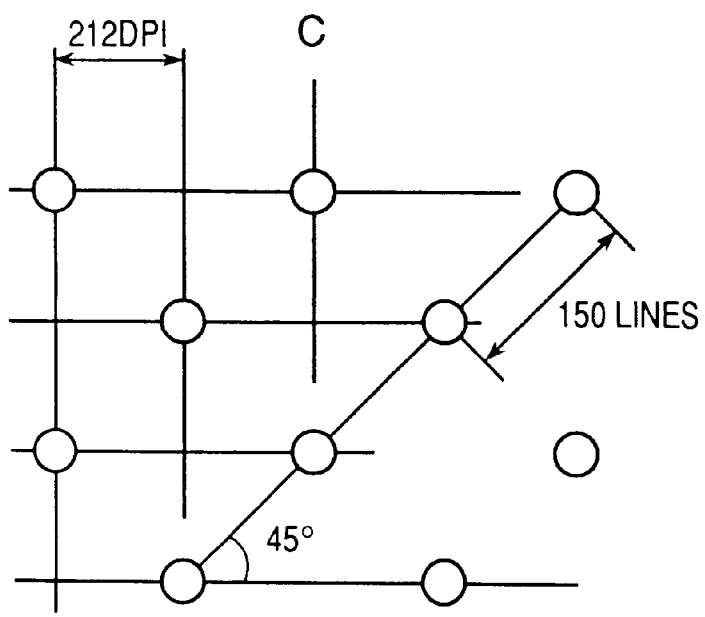
FIG. 22 is a diagram showing an image dot forming pattern of an output cyan image.
Figure 23:
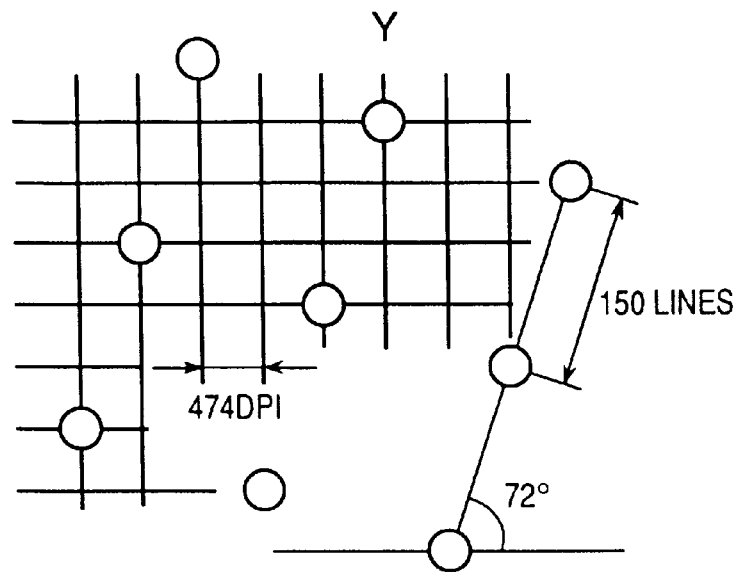
FIG. 23 is a diagram showing an image dot forming pattern of an output yellow image.
Figure 24:
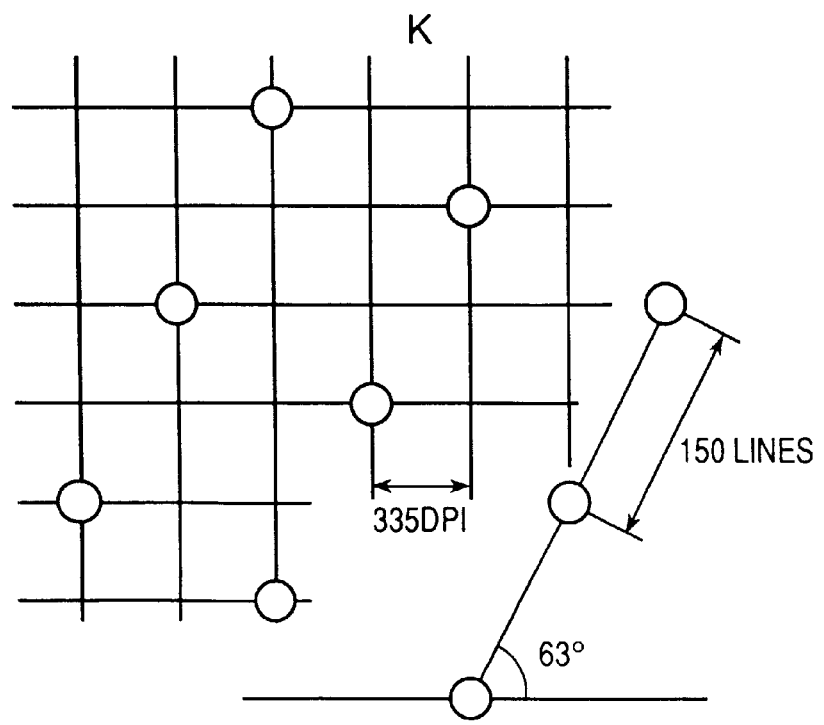
FIG. 24 is a diagram showing an image dot forming pattern of an output black image.

Similarly, FIG. 22 shows cyan recording in which the pixel dot recording timing is controlled in accordance with a reference recording period of 212 DPI in the main and sub-scanning directions so that an image having 150 lines and a screen angle of 45° is formed. FIG. 23 shows yellow recording in which the pixel dot recording timing is controlled in accordance with a reference recording period of 474 DPI in the main and sub-scanning directions so that an image having 150 lines and a screen angle of 72° is formed. FIG. 24 shows black recording in which the pixel dot recording timing is controlled in accordance with a reference recording period of 335 DPI in the main and sub-scanning directions so that an image having 150 lines and a screen angle of 63° is formed.

As described above, also the second embodiment has the arrangement that the plural recording periods in the main and sub-scanning directions are provided for the respective colors, a multi-color image having the number of screen lines and screen angles shown in FIGS. 21 to 24 can be formed. By combining the number of the screen lines and the screen angle for each color, generations of color shade and moire fringes can be prevented. Furthermore, generation of a peculiar texture pattern or deterioration of the image quality undergoing due to worsening of the resolution can be prevented. Therefore, an image exhibiting a satisfactory image quality can be obtained.

That is, the arrangement that the screen angle among M, C, Y and Bk is set to be 15° or more and yellow which is not a striking color as compared with the other colors is disposed among the foregoing colors prevents the generation of the moire fringes occurring due to the color interference. Furthermore, a somewhat large screen angle is made for each color from screen angles which are usually used in printing or the like to cope with a case where a printed image or the like is used as an original document so that generation of moire fringes taking place due to interference with the image of the original document is prevented. Furthermore, the number of the screen lines for M, C, Y and Bk is set to substantially 150 so that generation of a peculiar texture pattern visually striking in an image formed by superimposing the four colors can be prevented. In addition, an image exhibiting excellent image quality capable of coping with high-quality paper such as coat paper or art paper can be reproduced.

<First Modification>

Figure 25:
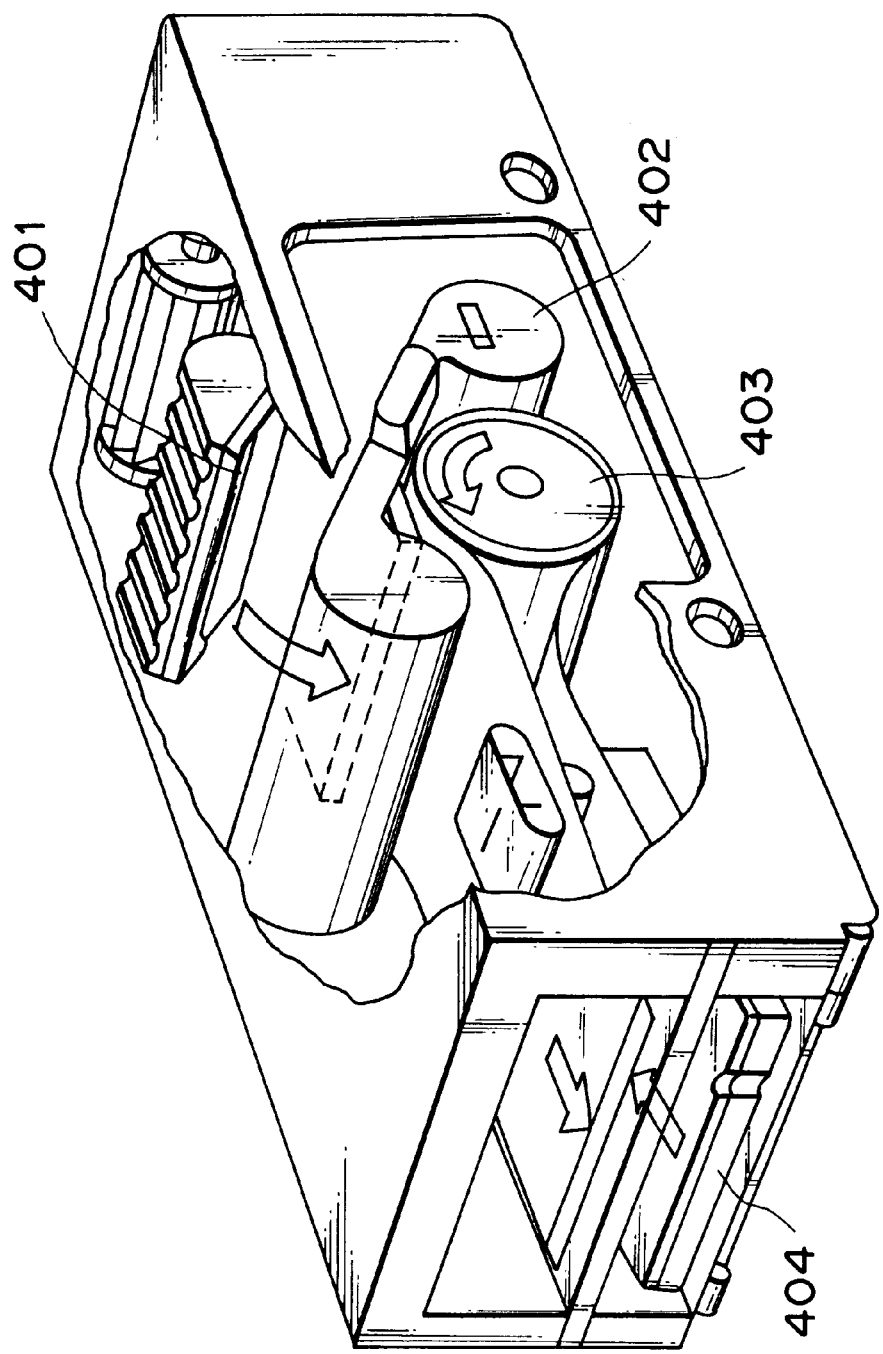
FIG. 25 is a schematic view showing a thermal transfer color printer according to a modification.

The present invention is not limited to the foregoing embodiments and it can be applied to a full color printer of a thermal transfer type shown in FIG. 25. For example, use of a plurality of thermal heads having different recording densities enables the reference recording density for the sub-scan to be independently set for each color. Furthermore, provision of a plurality of reference recording frequencies for the thermal heads for each color and independent setting of reference recording densities for the main scan for each color enable an image similar to that obtainable in the foregoing embodiments to be formed, and a similar effect can be obtained.

<Second Modification>

Figure 26:
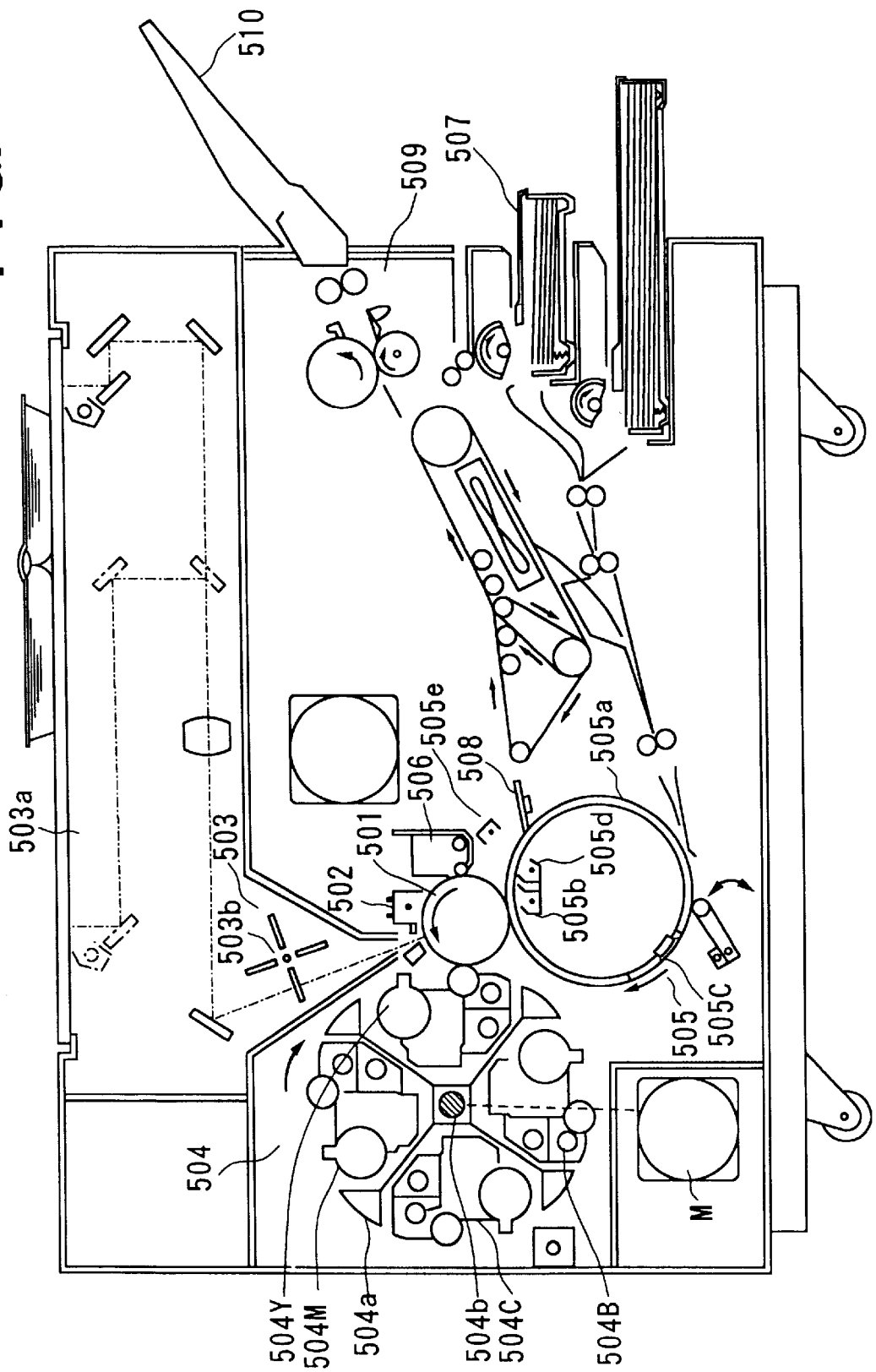
FIG. 26 is a schematic view showing a 1-drum type electrophotographic full color copying machine according to the modification.

The present invention can be applied to a 1-drum plane-sequential electrophotographic full color copying machine arranged as shown in FIG. 26. By varying the process speed or the revolving speed of the polygonal mirror for each color in the plane sequential manner, the recording period for the sub-scan, or the revolving speed of the polygonal mirror or the image signal scanning frequency can be varied for each color. Thus, the recording period for the main scam can be set independently for each color so that an image similar to that obtainable from the foregoing embodiment can be obtained, and a similar effect can be obtained.

<Third Modification>

Furthermore, the present invention may be applied to any one of various types of image forming apparatuses regardless of the recording method in addition to the foregoing image forming apparatus, for example: an image forming apparatus such as a color facsimile machine, a two or three-color multi-color copying machine or printer; any one of a variety of thermal transfer recording apparatuses such as a silver salt type apparatus, an electrostatic recording apparatus, a color forming type thermal recording apparatus, a wax transfer type recording apparatus, or a sublimation transfer type recording apparatus; any one of a variety of ink jet recording apparatuses such as a continuous type apparatus, a piezoelectric type apparatus, an electrostatic type apparatus, a thermal type apparatus or a discharge type apparatus; any one of a variety of electrophotographic apparatuses such as an LED printer or a laser beam printer; and so forth.

<Fourth Modification>

Although the foregoing embodiments have the arrangement that the plural recording periods are provided for both main and sub-scanning directions, a structure may be employed in which a plurality of recording periods are provided for either of the main scan or the sub-scan to be applied preferably.

<Fifth Modification>

The foregoing embodiments have the arrangement that the pixel dots are recorded in the main scanning direction at a period which is integer times the reference recording period and the pixel dots are recorded while shifting the phase, which is integer times the reference period, for each main scanning line. However, the present invention is not limited to the recording method of the foregoing type. An arrangement may be employed in which no reference recording period is provided, only a plurality of pixel dot recording periods corresponding to the respective colors are provided, an individual delay circuit or the like is used to control the quantity of delay in each scan and the phase of pixel dot recording is shifted. Also in this case a similar effect to that obtainable from the foregoing embodiments can be obtained.

The present invention may be applied to a system formed by a plurality of units or to an apparatus formed by one unit.

The present invention may, of course, be applied to a case where a program is supplied to a system or an apparatus.

As described above, according to the foregoing embodiment, possession of a plurality of recording periods for the recording means enables an image forming apparatus capable of preventing generation of color shade and moire fringes and thus forming an image exhibiting excellent image quality to be realized.

The present invention is not limited to the above embodiments and various changes and modifications can be made within the spirit and scope of the present invention. Therefore, to apprise the public of the scope of the present invention the following claims are made.

What is claimed is:

1. A color image forming apparatus, comprising:

input means for inputting a plurality of color component signals; and image forming means for forming a color image based on the color component signals in scanning, wherein said image forming means forms a color image so that a density of recording in a sub-scanning direction measured in dots per inch for a first color component signal of the color component signals is different from a density of recording in a sub-scanning direction measured in dots per inch for a second color component signal of the color component signals, and the density of recording in the scanning direction measured in dots per inch for the first color component signal is different from the density of recording in the scanning direction measured in dots per inch for the second color component signal.

2. An apparatus according to claim 1, wherein said image forming means comprises pulse width modulation means for generating a pulse width modulation signal by using a pattern signal having a predetermined period.

3. An apparatus according to claim 2, wherein said predetermined period differs between said first color component signal and said second color component signal.

4. An apparatus according to claim 2, wherein a phase of the pattern signal differs between said first color component signal and said second color component signal.

5. An apparatus according to claim 2, wherein said image forming means forms an image by using a beam generated from the pulse width modulation signal.

6. An apparatus according to claim 5, wherein said image forming means further comprises biasing means for biasing the beam.

7. An apparatus according to claim 6, wherein said biasing means comprises a polygonal mirror having plural planes which are different between said first color component signal and said second color component signal.

8. An apparatus according to claim 1, wherein said image forming means comprises an ink jet recording type printer.

9. An apparatus according to claim 1, wherein said image forming means comprises an electrophotographic recording type printer.

10. A color image forming method, comprising the steps of:

inputting a plurality of color component signals; and forming a color image based on the color component signals in scanning, wherein said image forming step forms a color image so that a density of recording in a sub-scanning direction measured in dots per inch for a first color component of the color component signals is different from a density of recording in a sub-scanning direction measured in dots per inch for a second color component of the color component signals, and the density of recording in the scanning direction measured in dots per inch for the first color component is different from the density of recording in the scanning direction measured in dots per inch for the second color component.

11. A color image forming apparatus, comprising:

input means for inputting a plurality of color component signals; and image forming means for forming a color image based on the color component signals in scanning, wherein said image forming means forms a color image by making scanning speeds differ from each other so that a density of recording in a sub-scanning direction measured in dots per inch for a first color component signal of the color component signals is different from a density of recording in a sub-scanning direction measured in dots per inch for a second color component signal of the color component signals.

12. An apparatus according to claim 11, wherein said image forming means comprises pulse width modulation means for generating a pulse width modulation signal by using a pattern signal having a predetermined period.

13. An apparatus according to claim 12, wherein said predetermined period differs between said first color component signal and said second color component signal.

14. An apparatus according to claim 12, wherein a phase of the pattern signal differs between said first color component signal and said second color component signal.

15. An apparatus according to claim 12, wherein said image forming means forms an image by using a beam generated from the pulse width modulation signal.

16. An apparatus according to claim 15, wherein said image forming means further comprises biasing means for biasing the beam.

17. An apparatus according to claim 16, wherein said biasing means comprises a polygonal mirror having plural planes which are different between said first color component signal and said second color component signal.

18. An apparatus according to claim 11, wherein said image forming means forms a color image so that recording densities of a main-scanning direction differ between a first color component signal and a second color component signal in the color component signals.

19. A color image forming method, comprising the steps of:

inputting a plurality of color component signals; and forming a color image based on the color component signals in scanning, wherein said image forming step forms a color image by making scanning speeds differ from each other so that a density of recording in a sub-scanning direction measured in dots per inch for a first color component signal of the color component signals is different from a density of recording in a sub-scanning direction measured in dots per inch for a second color component signal of the color component signals.

* * * * *